(12) United States Patent
Kim et al.

(10) Patent No.: US 11,929,001 B2
(45) Date of Patent: Mar. 12, 2024

(54) METHOD AND DEVICE FOR MEASURING ILLUMINANCE

(71) Applicant: Samsung Electronics Co., Ltd., Suwon-si (KR)

(72) Inventors: Jongah Kim, Suwon-si (KR); Kyusung Kim, Suwon-si (KR); Jeongho Cho, Suwon-si (KR); Heewoong Yoon, Suwon-si (KR); Kihyuk Lee, Suwon-si (KR); Donghan Lee, Suwon-si (KR); Gwangho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/159,959

(22) Filed: Jan. 26, 2023

(65) Prior Publication Data

US 2023/0169903 A1 Jun. 1, 2023

Related U.S. Application Data

(63) Continuation of application No. PCT/KR2021/006732, filed on May 31, 2021.

(30) Foreign Application Priority Data

Aug. 3, 2020 (KR) .................. 10-2020-0097009

(51) Int. Cl.
| | |
|---|---|
| *G09G 3/20* | (2006.01) |
| *G01J 1/18* | (2006.01) |
| *G01J 1/42* | (2006.01) |
| *G09G 3/00* | (2006.01) |
| *G09G 3/34* | (2006.01) |

(Continued)

(52) U.S. Cl.
CPC .............. *G09G 3/20* (2013.01); *G01J 1/4204* (2013.01); *G09G 2320/0626* (2013.01); *G09G 2330/021* (2013.01); *G09G 2360/144* (2013.01); *G09G 2360/16* (2013.01)

(58) Field of Classification Search
USPC ........................................................ 345/207
See application file for complete search history.

(56) References Cited

U.S. PATENT DOCUMENTS

2007/0040774 A1  2/2007  Lee et al.
2007/0279369 A1  12/2007  Yao et al.
(Continued)

FOREIGN PATENT DOCUMENTS

| JP | 07-255063 A | 10/1995 |
|---|---|---|
| JP | 2010-230969 A | 10/2010 |

(Continued)

*Primary Examiner* — Chineyere D Wills-Burns
(74) *Attorney, Agent, or Firm* — Jefferson IP Law, LLP

(57) ABSTRACT

A method and a device are provided. The device includes a light-measuring sensor, a display, a memory, and at least one processor operatively connected to the light-measuring sensor, the display, and the memory, wherein the at least one processor is configured to analyze the frequency of an external light source, obtain an operation period of the display, obtain a ratio of an off period of time of the display on the basis of the operation period, and calculate illuminance by using different algorithms on the basis of the relationship between the frequency of the external light source and the operation period and the ratio of the off period of time of the display.

20 Claims, 25 Drawing Sheets

(51) Int. Cl.
*G09G 5/00* (2006.01)
*G09G 5/10* (2006.01)

(56) References Cited

U.S. PATENT DOCUMENTS

| | | | |
|---|---|---|---|
| 2009/0224678 A1* | 9/2009 | Wang | G09G 3/3426 |
| | | | 315/158 |
| 2010/0245309 A1 | 9/2010 | Matsuki | |
| 2012/0092521 A1 | 4/2012 | Lee | |
| 2012/0200225 A1* | 8/2012 | Sawada | H05B 47/11 |
| | | | 315/151 |
| 2012/0235966 A1* | 9/2012 | Tanaka | G09G 3/3611 |
| | | | 345/207 |
| 2015/0211920 A1* | 7/2015 | Sossenheimer | G01J 1/0233 |
| | | | 356/218 |
| 2016/0018257 A1* | 1/2016 | Mirov | A61B 5/681 |
| | | | 250/206 |
| 2017/0059401 A1 | 3/2017 | Mazuelas et al. | |
| 2017/0078543 A1 | 3/2017 | Lee et al. | |
| 2017/0337895 A1* | 11/2017 | Kosugi | G06F 1/206 |
| 2018/0063435 A1 | 3/2018 | Cho et al. | |
| 2018/0348049 A1 | 12/2018 | Yoon et al. | |
| 2019/0052908 A1* | 2/2019 | Mertens | H04N 19/102 |
| 2020/0152724 A1 | 5/2020 | Cho et al. | |
| 2020/0219431 A1 | 7/2020 | Lee et al. | |
| 2020/0234659 A1 | 7/2020 | Ju et al. | |
| 2020/0242985 A1* | 7/2020 | Cho | G06F 3/0412 |
| 2021/0056896 A1 | 2/2021 | Greimel-Langauer et al. | |

FOREIGN PATENT DOCUMENTS

| | | |
|---|---|---|
| KR | 10-0624136 B1 | 9/2006 |
| KR | 10-2012-0038203 A | 4/2012 |
| KR | 10-1635220 B1 | 7/2016 |
| KR | 10-2017-0030789 A | 3/2017 |
| KR | 10-2017-0121378 A | 11/2017 |
| KR | 10-2018-0024299 A | 3/2018 |
| KR | 10-2018-0048885 A | 5/2018 |
| KR | 10-2018-0131848 A | 12/2018 |
| KR | 10-2020-0055330 A | 5/2020 |
| KR | 10-2020-0084574 A | 7/2020 |
| KR | 10-2020-0089593 A | 7/2020 |
| WO | 2019/149811 A1 | 8/2019 |

\* cited by examiner (650)

(655)

(670)

(675)

(830)

(840)

(850)

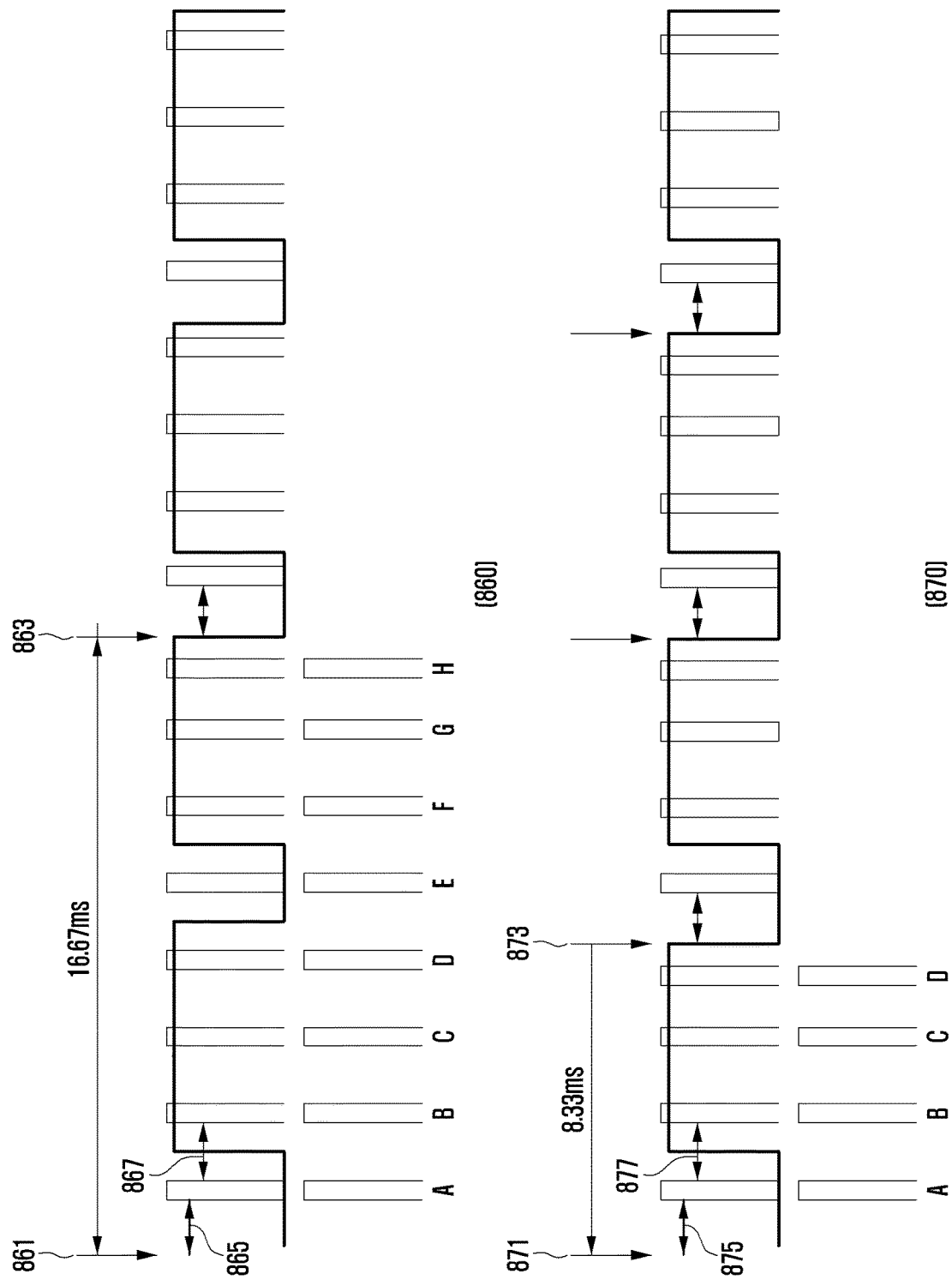

(880)

(890)

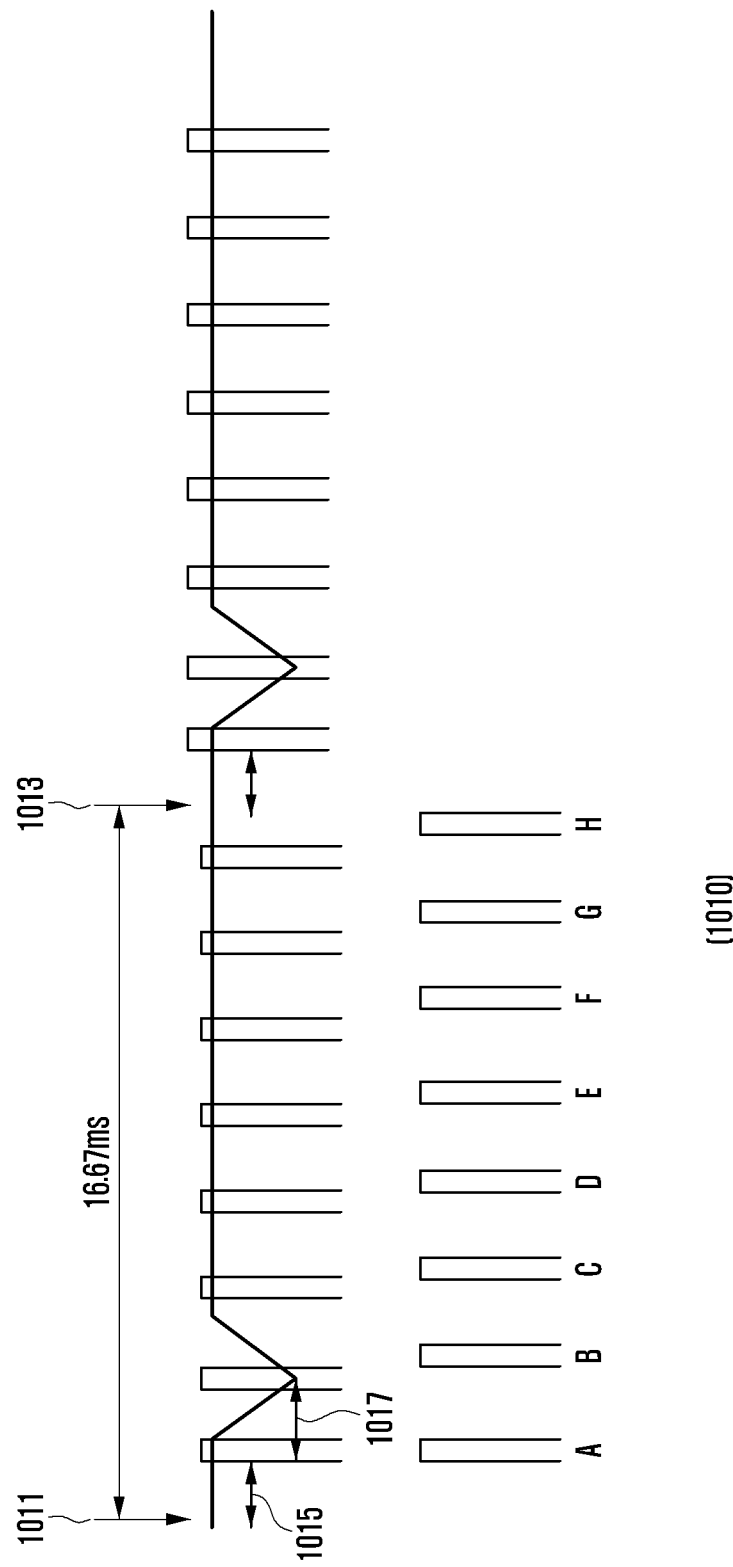

[1030]

[1040]

[1050]

(1070)

| Number of samples | Period/Number of samples | Sensing time |
|---|---|---|
| 3 | 1.386667 | 1.223667 |
| 4 | 1.04 | 0.877 |
| 5 | 0.832 | 0.669 |
| 6 | 0.693333 | 0.530333 |
| 7 | 0.594286 | 0.431286 |
| 8 | 0.52 | 0.357 |
| 9 | 0.462222 | 0.299222 |

| # | Illuminance | Average | # | Illuminance | Average |
|---|---|---|---|---|---|
| [1] | 0 | 96.0 | [33] | 130 | 86.6 |
| [2] | 22 | | [34] | 128 | |
| [3] | 130 | | [35] | 132 | |
| [4] | 130 | | [36] | 128 | |
| [5] | 130 | | [37] | 88 | |
| [6] | 130 | | [38] | 0 | |
| [7] | 130 | | [39] | 0 | |
| [8] | 0 | 0.0 | [40] | 0 | 0.0 |
| [9] | 0 | | [41] | 0 | |
| [10] | 0 | | [42] | 0 | |
| [11] | 0 | | [43] | 0 | |
| [12] | 0 | | [44] | 0 | |
| [13] | 0 | | [45] | 0 | |
| [14] | 0 | | [46] | 0 | |
| [15] | 0 | 79.7 | [47] | 100 | 96.0 |
| [16] | 0 | | [48] | 126 | |
| [17] | 46 | | [49] | 132 | |
| [18] | 126 | | [50] | 126 | |
| [19] | 128 | | [51] | 130 | |
| [20] | 130 | | [52] | 58 | |
| [21] | 128 | | [53] | 0 | |
| [22] | 114 | 16.3 | [54] | 0 | |
| [23] | 0 | | [55] | 0 | |
| [24] | 0 | | [56] | 0 | |
| [25] | 0 | | [57] | 0 | |
| [26] | 0 | | [58] | 0 | |
| [27] | 0 | | [59] | 0 | |
| [28] | 0 | | | | |
| [29] | 0 | | | | |
| [30] | 0 | | | | |
| [31] | 0 | | | | |
| [32] | 80 | | | | |

| # | Illuminance | Average | # | Illuminance | Average |
|---|---|---|---|---|---|
| [1] | 160 | 192.0 | [33] | 264 | 146.3 |
| [2] | 224 | | [34] | 256 | |
| [3] | 276 | | [35] | 124 | |
| [4] | 272 | | [36] | 132 | |
| [5] | 148 | | [37] | 128 | |
| [6] | 132 | | [38] | 16 | |
| [7] | 132 | | [39] | 104 | |
| [8] | 92 | 110.9 | [40] | 124 | 156.0 |
| [9] | 28 | | [41] | 132 | |
| [10] | 128 | | [42] | 128 | |
| [11] | 128 | | [43] | 132 | |
| [12] | 128 | | [44] | 188 | |
| [13] | 132 | | [45] | 212 | |
| [14] | 140 | | [46] | 176 | |
| [15] | 268 | 209.7 | [47] | 268 | 161.1 |
| [16] | 144 | | [48] | 268 | |
| [17] | 260 | | [49] | 212 | |
| [18] | 272 | | [50] | 128 | |
| [19] | 264 | | [51] | 128 | |
| [20] | 132 | | [52] | 124 | |
| [21] | 128 | | [53] | 0 | |
| [22] | 128 | 104.0 | [54] | 124 | |
| [23] | 48 | | [55] | 124 | |
| [24] | 60 | | [56] | 128 | |
| [25] | 120 | | [57] | 124 | |
| [26] | 120 | | [58] | 124 | |
| [27] | 128 | | | | |
| [28] | 124 | | | | |
| [29] | 152 | | | | |
| [30] | 252 | | | | |
| [31] | 148 | | | | |
| [32] | 268 | | | | |

METHOD AND DEVICE FOR MEASURING ILLUMINANCE

CROSS-REFERENCE TO RELATED APPLICATION(S)

This application is a continuation application, claiming priority under § 365(c), of an International application No. PCT/KR2021/006732, filed on May 31, 2021, which is based on and claims the benefit of a Korean patent application number 10-2020-0097009, filed on Aug. 3, 2020, in the Korean Intellectual Property Office, the disclosure of which is incorporated by reference herein in its entirety.

BACKGROUND

1. Field

The disclosure relates to a method and a device for measuring illuminance.

2. Description of Related Art

In line with development of digital technology, various types of electronic devices such as mobile communication terminals, personal digital assistants (PDAs), electronic notebooks, smartphones, personal computers (PCs), and wearable devices have been widely used. Hardware parts and/or software parts of these electronic devices are continuously being improved in order to support and increase functions thereof.

As an example, an electronic device provides a function of adjusting brightness, contrast, and/or luminance of a display for the convenience of a user. For example, an electronic device is equipped with a function of detecting ambient light using an illuminance sensor (ambient light sensor (ALS)) and automatically adjusting the brightness of a display corresponding to the ambient light. For example, the electronic device may have (or include) an illuminance sensor disposed in an inactive area of the display (e.g., a bezel arrangement structure) or in an active area of the display (e.g., an under-panel arrangement structure) and measure the ambient light through the illuminance sensor, thereby automatically adjusting the brightness of the display, based on the same.

In the case where an illuminance sensor is disposed on a rear surface of a display, some of the light emitted from the display may be incident onto the illuminance sensor, thereby reducing the accuracy of illuminance (or an illuminance value) measured by the illuminance sensor. Alternatively, the light incident onto the illuminance sensor may be reduced because it is covered by the display, resulting in reduction of measurement performance. In order to compensate for this disadvantage, the electronic device configures an illuminance measurement time (integration time) of the illuminance sensor (e.g., the minimum operating time for illuminance sensing) to be less than an off period among the display on/off operation per duty cycle (or per one frame) of the display, measures illuminance values in the off period, and determines a minimum value among the measured illuminance values to be an illuminance value. However, if the minimum value of the external light source (e.g., an AC light source) overlaps the off period of time of a display operation period, the electronic device may calculate the illuminance value to be low even if the ambient light is not low, thereby operating a screen of the display at a low brightness.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device capable of more accurately measuring illuminance by calculating a ratio of an off period of time of a display, based on an operation period of the display and measuring illuminance using different algorithms (e.g., illuminance measurement methods) based on whether or not the ratio of an off period of time exceeds a configured threshold value, the relationship between a frequency of an external light source and the operation period of the display, or whether or not it is synchronized with a light-measuring sensor.

The technical problem to be solved in the embodiments disclosed in this document is not limited to the above-mentioned technical problem, and other technical problems not mentioned above will be clearly understood by those of ordinary skill in the art to which the disclosure belongs from the description below.

Additional aspects will be set forth in part in the description which follows and, in part, will be apparent from the description, or may be learned by practice of the presented embodiments.

In accordance with an aspect of the disclosure, an electronic device is provided. The electronic device includes a light-measuring sensor, a display, a memory, and at least one processor operatively connected to the light-measuring sensor, the display, and the memory, wherein the at least one processor may be configured to analyze a frequency of an external light source, obtain an operation period of the display, obtain a ratio of an off period of time of the display, based on the operation period, and calculate illuminance using different algorithms, based on the ratio of an off period of time of the display and a relationship between the frequency of the external light source and the operation period.

In accordance with another aspect of the disclosure, an operation method of an electronic device is provided. The operation method includes analyzing a frequency of an external light source, obtaining an operation period of a display included in the electronic device, obtaining a ratio of an off period of time of the display, based on the operation period, and calculating illuminance using different algorithms, based on the ratio of an off period of time of the display and a relationship between the frequency of the external light source and the operation period.

According to various embodiments, it is possible to more accurately measure illuminance by measuring the illuminance using different algorithms, based on a frequency of an external light source and a display operation period of an electronic device.

According to various embodiments, if the ratio of an off period of time of a display exceeds a threshold value and if the frequency of a light source is less than the display operation period, it is possible to calculate illuminance by averaging or summating illuminance values sensed in an off period of time of the display, based on a synchronization signal of the display.

According to various embodiments, if the ratio of an off period of time of a display exceeds a threshold value and if the frequency of a light source is greater than or equal to the display operation period, it is possible to calculate illuminance by calculating, based on a synchronization signal of the display, an intermediate value of an illuminance value sensed in an off period of time of the display and an illuminance value sensed in an on period of time of the display.

According to various embodiments, if the ratio of an off period of time of a display is less than or equal to a threshold value, it is possible to calculate illuminance, based on a maximum value and a minimum value of a plurality of illuminance values sensed close to the off period of time of the display, based on a synchronization signal of the display, and a plurality of illuminance values sensed in the rest of the display operation period.

According to various embodiments, if a synchronization signal is not received from the light-measuring sensor, it is possible to calculate a first average of a configured number of illuminance values sensed during a display operation period, calculate a second average of a configured number of illuminance values sensed during a display operation period shifted by a predetermined period, and calculate illuminance, based on a minimum value of the sensed illuminance values and the first and second average values.

Pulse width modulation (PWM) signal information of a display is required to obtain an accurate on/off period of time of the display, but a change in the hardware structure such as adding a pin connecting the display driving circuit and the light-measuring sensor or adding a pin connecting a processor of the electronic device and the light-measuring sensor may be required to receive the PWM signal. In addition, costs may occur due to the change in the hardware structural. According to various embodiments of the disclosure, it is possible to accurately calculate illuminance using an on/off period of time of a display and a time delay register of the light-measuring sensor without changing the hardware structure, thereby reducing costs and securing a mounting space of the electronic device by reducing the number of connection pins between hardware.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A, 8B, 8C, and 8D are diagrams illustrating an example of measuring illuminance, based on a second illuminance measurement method according to various embodiments of the disclosure;

FIGS. 10A, 10B, and 10C are diagrams illustrating an example of measuring illuminance, based on a third illuminance measurement method according to various embodiments of the disclosure;

FIGS. 12A, 12B, 12C, 12D, and 12E are diagrams illustrating an example of measuring illuminance, based on a fourth illuminance measurement method according to various embodiments of the disclosure.

Throughout the drawings, like reference numerals will be understood to refer to like parts, components, and structures.

DETAILED DESCRIPTION

Figure 1:
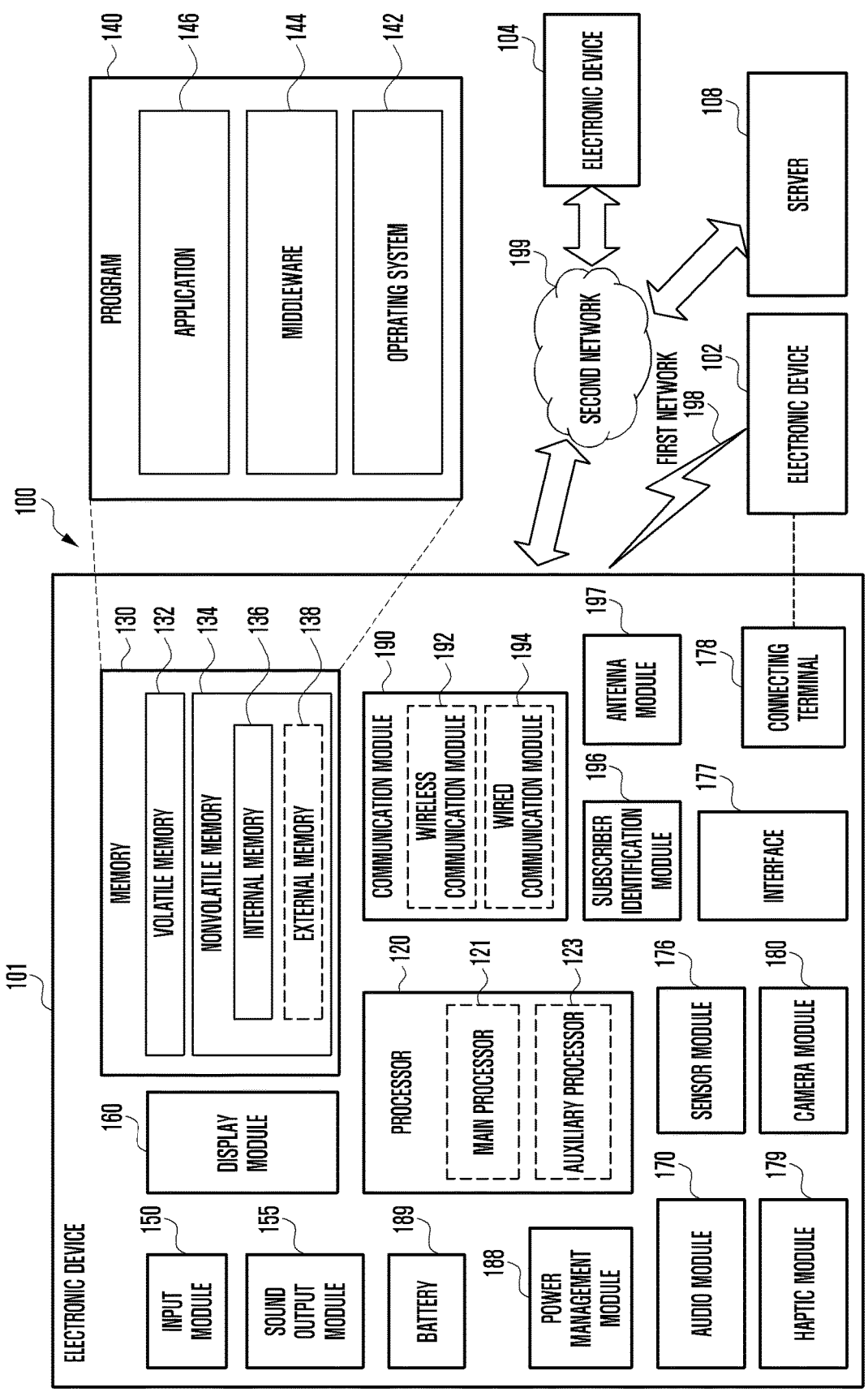
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. In an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In other embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. In one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may be configured to control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. In an embodiment, the memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. In an embodiment, the input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. In an embodiment, the receiver may be used for receiving incoming calls. According to another embodiment, the receiver may be implemented as separate from, or as part of the speaker.

The display module 160 may be configured to visually provide information to the outside (e.g., a user) of the electronic device 101. In an embodiment, the display module 160 may include, for example, a display, a hologram device, or a projector and control circuitry to control a corresponding one of the display, hologram device, and projector. According to another embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. In an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. In an embodiment, the haptic module 179 may include, for example, a motor, a piezoelectric element, or an electric stimulator.

The camera module 180 may be configured to capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may be configured to support establishing a direct (e.g., wired) communication channel or a wireless communication channel between the electronic device 101 and the external electronic device (e.g., the electronic device 102, the electronic device 104, or the server 108) and performing communication via the established communication channel. In an embodiment, the communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. In an embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

In another embodiment, the wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 G bits per second (bps) or more) for implementing eMBB, loss coverage (e.g., 164 decibels (dB)

or less) for implementing mMTC, or U-plane latency (e.g., 0.5 ms or less for each of downlink (DL) and uplink (UL), or a round trip of 1 ms or less) for implementing URLLC.

The antenna module 197 may be configured to transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to another embodiment, another component (e.g., a radio frequency integrated circuit (RFIC)) other than the radiating element may be additionally formed as part of the antenna module 197.

According to certain embodiments, the antenna module 197 may form a mmWave antenna module. According to another embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. In another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. In an embodiment, the electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to another embodiment, the external electronic device 104 or the server 108 may be included in the second network 199. The electronic device 101 may be applied to intelligent services (e.g., smart home, smart city, smart car, healthcare, and the like) based on 5G communication technology or IoT-related technology.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. In an embodiment, the machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. In an embodiment, the computer program product may be traded as a product between a seller and a buyer. In another embodiment, the computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to yet other embodiments, operations performed by the module, the program, or another component may be carried out sequentially, in parallel, repeatedly, or heuristically, or one or more of the operations may be executed in a different order or omitted, or one or more other operations may be added.

Figure 2A:
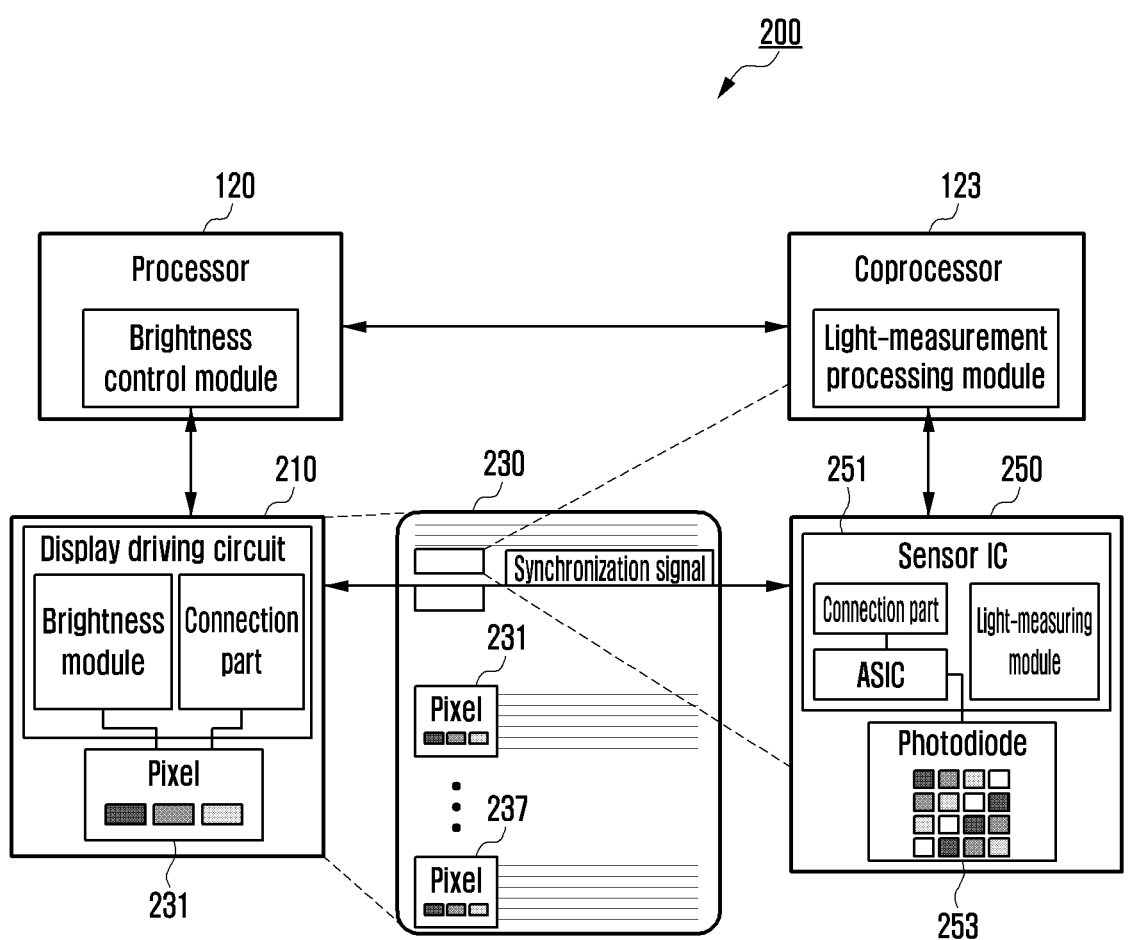
FIGS. 2A and 2B are diagrams illustrating a configuration of an electronic device according to various embodiments of the disclosure.
Figure 2B:
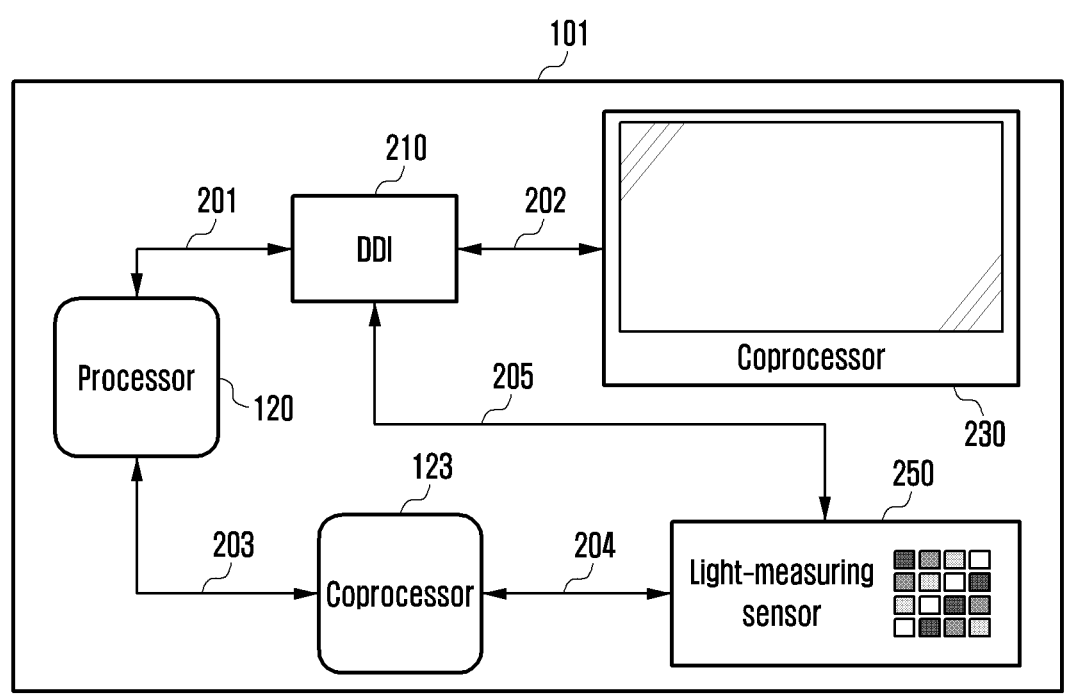

FIGS. 2A and 2B are diagrams illustrating a configuration of an electronic device according to various embodiments of the disclosure.

FIG. 2A is a diagram illustrating a configuration 200 of an electronic device according to an embodiment of the disclosure.

Referring to FIG. 2A, an electronic device (e.g., the electronic device 101 in FIG. 1) according to various embodiments may include a processor 120, a coprocessor 123, a display driving circuit 210 (e.g., display driver integrated circuit (DDI)), a display panel 230, and/or a light-measuring sensor 250. In some embodiments, the electronic device 101 may exclude at least one of the elements shown in FIG. 2A or further include at least one or more other elements. The display driving circuit 210 and the display panel 230 may be included in a display (e.g., the display module 160 in FIG. 1).

According to other embodiments, the processor 120 may control content to be displayed on the display module 160 or the properties (e.g., colors and brightness) of the display module 160. The processor 120 may include a brightness control module, and the brightness control module may determine the brightness (or illuminance) of the display module 160, based on an illuminance value calculated by the coprocessor 123. In an embodiment, the processor 120 may control the overall operation of the electronic device 101 and control input and output of data packets having display data (e.g., data to be displayed on the display) according to a clock (CLK). For example, the data packet may include display data, horizontal synchronization (Hsync), vertical synchronization (Vsync) (e.g., the first synchronization signal 311 and the second synchronization signal 315 in FIG. 3B), and/or data enable (DE).

In an embodiment, the coprocessor 123 may serve as a sensor hub and may be able to perform measurement with low-power without requiring high-performance processing. In another embodiment, the coprocessor 123 may control the overall operation of a sensor module (e.g., the sensor module 176 in FIG. 1). The coprocessor 123 may include a light-measurement processing module, and the light-measurement processing module may calculate an illuminance value, based on a sensing value (e.g., an illuminance value) sensed by the light-measuring sensor 250. For example, the light-measurement processing module may control an algorithm of the light-measuring sensor 250 and configure a gain of the light-measuring sensor 250 depending on the ambient light or calculate an illuminance value according to the configured algorithm.

According to various embodiments, the display driving circuit 210 is a circuit for controlling the display panel 230 and may control the brightness and timing for driving the display panel 230. For example, the display driving circuit 210 may control signals for controlling colors, brightness, and data for each of a plurality of pixels 231 to 237 included in the display panel 230. In an embodiment, the display driving circuit 210 may be connected to the display panel 230 through a printed circuit board (PCB) (e.g., a printed board assembly (PBA), a flexible printed circuit board (FPCB), or a rigid-flexible PCB (RFPCB)) or a film and may be configured independently of the display panel 230. The display driving circuit 210 may be connected to the processor 120 and perform control to display an image or a video generated by the processor 120 on the display panel 230. The display driving circuit 210 may include a brightness module interworking with a brightness control module included in the processor 120 and a connection part for timing synchronization with the light-measuring sensor 250. According to other embodiments, the display driving circuit 210 may receive input of data packets from the processor 120 through an interface and output a horizontal synchronization signal, a vertical synchronization signal, a data enable signal, display data, and/or clock.

According to yet other embodiments, the display panel 230 is a screen display device of the electronic device 101 and may have various types such as an organic LED (OLED), a quantum-dot LED (QLED), and a liquid crystal display (LCD) according to a display method or structure. The brightness of the display panel 230 may vary depending on the type of display and may be changed by a user's configuration or determined based on the ambient light measured through the light-measuring sensor 250. For example, in the case of a high ambient light such as the outdoors, the display panel 230 may increase the brightness to secure display visibility, and in the case of a low ambient light, the brightness may be reduced to prevent glare or some components of light (e.g., blue light) may be removed for eye health. Alternatively, the brightness of the display panel 230 may be determined by a duty ratio indicating an on/off ratio of the display. For example, the brightness of the display panel 230 may increase as the on ratio increases and decrease as the off ratio increases.

Although described as the display panel 230, the display (e.g., the display module 160 in FIG. 1) according to the embodiment of the disclosure may include other layers constituting mechanical configuration in addition to the display panel 230. In an example, it may include a cover layer (e.g., a transparent window), a polarizing layer (e.g., a polarizer or retarder), a light-blocking layer (e.g., a black embo tape), a buffer layer (e.g., a cushion foam), a digitizer layer (e.g., a digitizer), a shielding layer (e.g., an absorber), or a composite sheet layer (or a heat diffusion layer or an electromagnetic-wave shielding layer) (e.g., graphite or a conductive tape).

According to various embodiments, the light-measuring sensor 250 is a sensor for measuring the intensity of ambient light and may include a sensor IC 251 and a photodiode 253. In an embodiment, the sensor IC 251 may include a light-measuring module interworking with the light-measurement processing module included in the coprocessor 123 or a connection part for receiving a synchronization signal from the display driving circuit 210. In another embodiment, the light-measuring sensor 250 may be disposed on the rear surface of the display panel 230. For example, the light-measuring sensor 250 may include any type of sensor using the intensity of light, such as an illuminance sensor, an infrared (IR) sensor (e.g., a proximity sensor or a gesture sensor), a spectrometric sensor, an RGB sensor, or an ultraviolet (UV) sensor. For example, the illuminance sensor may receive red, green, and blue bands of visible light and all visible light (e.g., clear and IR) to determine an illuminance value through the signal strength according to the amount of light received. In example, in the illuminance sensor, in the case of ample external light, a large amount of light enters the photodiode 253 so that an analog digital converter (ADC) value may be sensed to be high, and in the case of little external light, a small amount of light enters the photodiode 253 so that an analog digital converter (ADC) value may be sensed to be low. In addition, the photodiode 253 may receive light in a band of about 400 nm to about 1000 nm.

FIG. 2B is a diagram illustrating a configuration of an electronic device according to an embodiment of the disclosure. For example, it is a diagram showing internal connections of an electronic device.

Referring to FIG. 2B, a processor 120 and a display driving circuit 210 included in an electronic device 101 may be connected by an electrical path 201 (or an interface). The electrical path 201 may be a mobile industry processor interface (MIPI), a compact display port (CDP), or a mobile display digital interface (MDDI). The display driving circuit 210 and the display panel 230 may be connected through an electrical path 202. In an embodiment, the display driving circuit 210 may transmit, to the display panel 230, a signal and/or data (e.g., display data) for driving the display panel 230 through the electrical path 202. In another embodiment, the processor 120 and the coprocessor 123 may be connected through an electrical path 203, and the electrical path 203 may be an inter integrated circuit (I2C) or a serial programming interface (SPI). The coprocessor 123 and the light-measuring sensor 250 may be connected through an electrical path 204, and the electrical path 204 may be an I2C. The display driving circuit 210 and the light-measuring sensor 250 may be connected through an electrical path 205 so that the light-measuring sensor 250 and the display of the display panel 230 may be synchronized in timing (e.g., the synchronization signal in FIG. 2A) through the electrical path 205.

In an embodiment, an electronic device (e.g., the electronic device 101 in FIG. 1) according to various embodiments of the disclosure may include a light-measuring sensor (e.g., the light-measuring sensor 250 in FIG. 2A), a display module (e.g., the display module 160 in FIG. 1), a memory (e.g., the memory 130 in FIG. 1), and a processor (e.g., the processor 120 in FIG. 1) operatively connected to the light-measuring sensor, the display module, and the memory, wherein the processor may be configured to analyze a frequency of an external light source, obtain an operation period of the display module, obtain a ratio of an off period of time of the display, based on the operation period, and calculate illuminance using different algorithms, based on the ratio of an off period of time of the display and a relationship between the frequency of the external light source and the operation period.

In another embodiment, the processor may be configured to determine whether the ratio of an off period of time is less than or equal to a configured threshold value and, if the ratio of an off period of time is less than or equal to the configured threshold value, calculate illuminance, based on a third algorithm.

In yet another embodiment, the processor may be configured to calculate illuminance, based on a plurality of first illuminance samples sensed, based on the off period of time of the display, based on a synchronization signal of the display, and a median value of a plurality of second illuminance samples sensed in the rest of the display operation period if the ratio of an off period of time is equal to or less than the configured threshold value.

Some of the plurality of second illuminance samples may overlap the plurality of first illuminance samples, and the processor may be configured to calculate an amplitude value of illuminance corresponding to color information using the plurality of first illuminance samples and calculate illuminance by subtracting a value obtained by multiplying the amplitude value of illuminance by a variable from the median value of the plurality of second illuminance samples.

In still another embodiment, the processor may be configured to determine, if the ratio of an off period of time exceeds the configured threshold value, whether or not the frequency of the external light source is less than the operation period and calculate, if the frequency of the external light source is less than the operation period, illuminance, based on a first algorithm The processor may be configured to calculate, as illuminance, an average of illuminance samples sensed during the off period of time of the display, based on a synchronization signal of the display, or a sum of illuminance samples sensed during the off period of time of the display if the frequency of the external light source is less than the operation period.

The processor may be configured to calculate illuminance, if the frequency of the external light source is greater than or equal to the operation period, using first illuminance sample sensed first during the display operation period, based on a synchronization signal of the display, and a median value of a plurality of illuminance samples sensed at sensing timing intervals during the display operation period.

In an embodiment, the processor may be configured to calculate an amplitude value of illuminance, based on a minimum value and a maximum value of the plurality of illuminance samples, and calculate illuminance by summating the first illuminance sample and the amplitude value of illuminance.

In another embodiment, the processor may be configured to calculate illuminance, when synchronized with the light-measuring sensor, using different algorithms, based on a ratio of an off period of time of the display and a relationship between the frequency of the external light source and the operation period.

In yet another embodiment, the processor may be configured to identify, when not synchronized with the light-measuring sensor, a configured number of first illuminance samples during an arbitrary period, identify a configured number of second illuminance samples during the arbitrary period after a predetermined time delay, and calculate illuminance, based on the first illuminance samples and the second illuminance samples.

The processor may be configured to calculate a minimum value of all illuminance samples including the first illuminance samples and the second illuminance samples, calculate a median value between an average value of the first illuminance samples and an average value of the second illuminance samples, and calculate illuminance, based on the minimum value of all the illuminance samples and the median value of the illuminance samples.

Figure 3A:
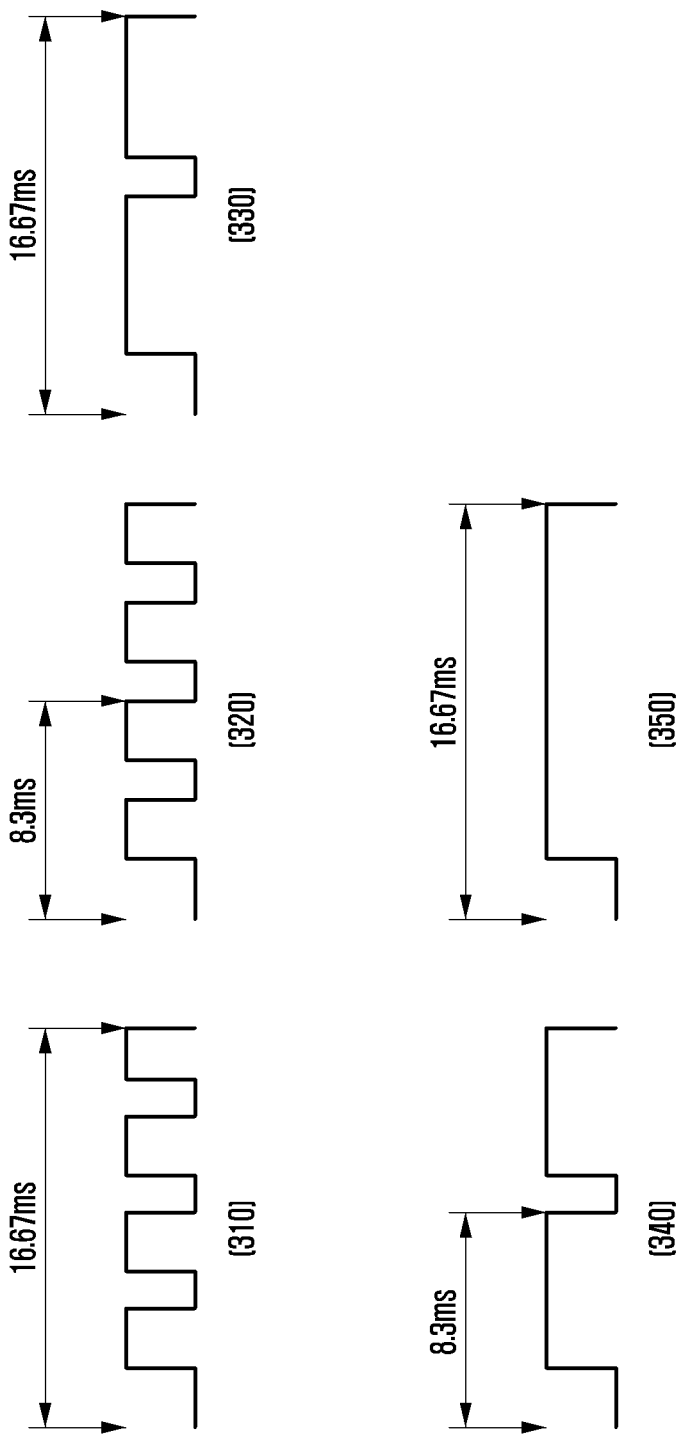
FIGS. 3A and 3B are diagrams illustrating an example of a driving scheme of a display and a sensor according to various embodiments of the disclosure.
Figure 3B:
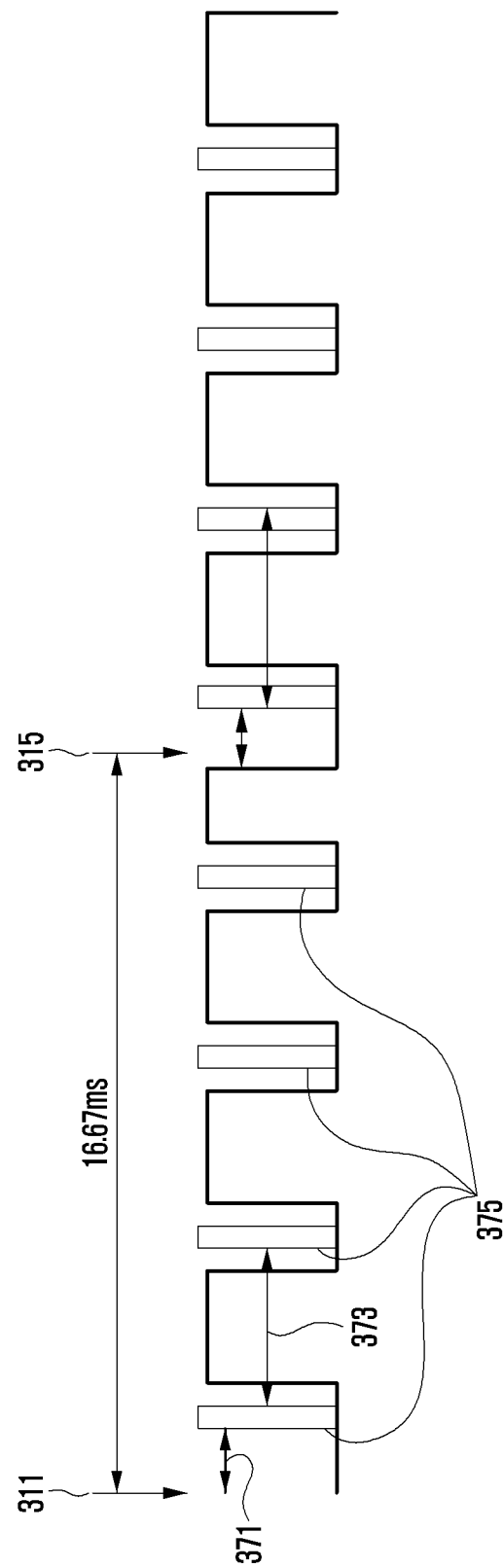

FIGS. 3A and 3B are diagrams illustrating an example of a driving scheme of a display and a sensor according to various embodiments of the disclosure.

FIG. 3A is a diagram illustrating a driving scheme of a display according to an embodiment of the disclosure.

Referring to FIG. 3A, an image (or video) may be produced by continuous movement of still images (or frames). A screen refresh rate may denote the number of times a display (e.g., the display module 160 in FIG. 1) displays a frame on the screen during one second and may be a number indicating how many scenes is able to be displayed during one second. In an embodiment, the screen refresh rate (or a display driving frequency) uses Hertz (Hz), as the unit, indicating the number of repetitions per second, and, for example, a display with a refresh rate of 60 Hz may denote that 60 frames are displayed during one second. As a similar concept, frames per second (FPS) may be mainly used for an image source (e.g., software), and hertz may be used for hardware of a display because it has a concept of frequency at which cycles are repeated.

According to various embodiments, the display module 160 (e.g., the display panel 230 in FIGS. 2A and 2B) may be driven in a pulse width modulation (PWM) scheme. The PWM scheme may be used to convert a digital signal into an analog signal. In an embodiment, conversion of a digital signal into an analog signal may intended to turn on/off the light of the display module 160, adjust the brightness thereof, or express various colors. In order to convert a digital signal into an analog signal, the display module 160 may be driven while emitting light (e.g., on) or not emitting light (e.g., off). For example, the longer the time during which the display module 160 is turned on, the higher the brightness of the display module 160, and the longer the time during which the display module 160 is turned off, the lower the brightness of the display module 160.

According to other embodiments, the on/off ratio of the display module 160 per one frame may be referred to as a "duty cycle". On/off of the display module 160 during one frame (or during one duty cycle) may be referred to as a "display operation period (or a display on-off operation period)". In an embodiment, the display module 160 may be driven for various operation periods of a display, based on a display driving frequency (or screen refresh rate) under the control of the processor (e.g., the processor 120 in FIG. 1). A first driving scheme 310 may be to repeat the on/off operation four times (4 duty) during an operation period (e.g., 16.67 ms) of the display when operating at 60 Hz. A second driving scheme 320 may be to repeat the on/off operation twice during an operation period (e.g., 8.33 ms) of the display when operating at 120 Hz. A third driving scheme 330 may be to repeat the on/off operation twice during an operation period (e.g., 16.67 ms) of the display when operating at 60 Hz. A fourth driving scheme 340 may be to repeat the on/off operation once during an operation period (e.g., 8.33 ms) of the display when operating at 120 Hz. A fifth driving scheme 350 may be to repeat the on/off operation once during an operation period (e.g., 16.67 ms) of the display when operating at 60 Hz.

According to various embodiments, an amoled off ratio (AOR) may indicate a ratio of an off period of time during one duty cycle. For example, the processor 120 may obtain an off period of time of the display module 160 by multiplying 1 duty duration by the AOR. In another example, if the display operation period is determined according to the first driving scheme 310 and if the AOR is 15%, the off period of time may be (16.67 ms/4duty)*15%=625 us.

FIG. 3B is a diagram illustrating a driving scheme of a light-measuring sensor according to an embodiment of the disclosure.

Referring to FIG. 3B, a light-measuring sensor (e.g., a light-measuring sensor 250 in FIGS. 2A and 2B) may be a sensor for measuring intensity of light incident from an external light source (or a surrounding light source) through a photodiode (e.g., a photodiode 253 in FIG. 2A). In an embodiment, the light-measuring sensor 250 may determine a sensing start timing 371, based on a first synchronization signal 311 (VSYNC) obtained from a display (e.g., the display module 160 in FIG. 1). The sensing start timing 371 may indicate the time at which sensing starts after a predetermined time (delay) from the start time of the first synchronization signal 311. In another embodiment, the light-measuring sensor 250 may determine a sensing interval timing 373 for sensing from the sensing start timing 371 until a second synchronization signal 315 (VSYNC) is obtained. The sensing interval timing 373 may indicate the interval between first sensing and second sensing. The light-measuring sensor 250 may determine how many illuminance samples (e.g., the number of illuminance samples 375) are to be obtained during the display operation period. The light-measuring sensor 250 may determine a sensing driving scheme including the sensing start timing 371, the sensing interval timing 373, or the number of illuminance samples 375, based on the driving scheme of the display.

According to a comparative example, if a minimum value measured by the light-measuring sensor 250 and the off period of time of the display module 160 overlap each other, the processor 120 may perform control such that the intensity of light (e.g., an illuminance value) according to the ambient light is calculated to be low. According to some embodiments, in order to more accurately measure the intensity of light without the influence of the display module 160, the processor 120 may calculate a ratio of an off period of time (e.g., AOR) of the display, based on the operation period of the display and measure illuminance using different algorithms (or measurement methods), based on whether or not the ratio of an off period of time exceeds a configured threshold value, a relationship between a frequency of an external light source and the operation period of the display, and/or whether or not it is synchronized with the light-measuring sensor, thereby more accurately measuring the illuminance. A detailed description of the algorithm will be described with reference to the drawings below.

Figure 4:
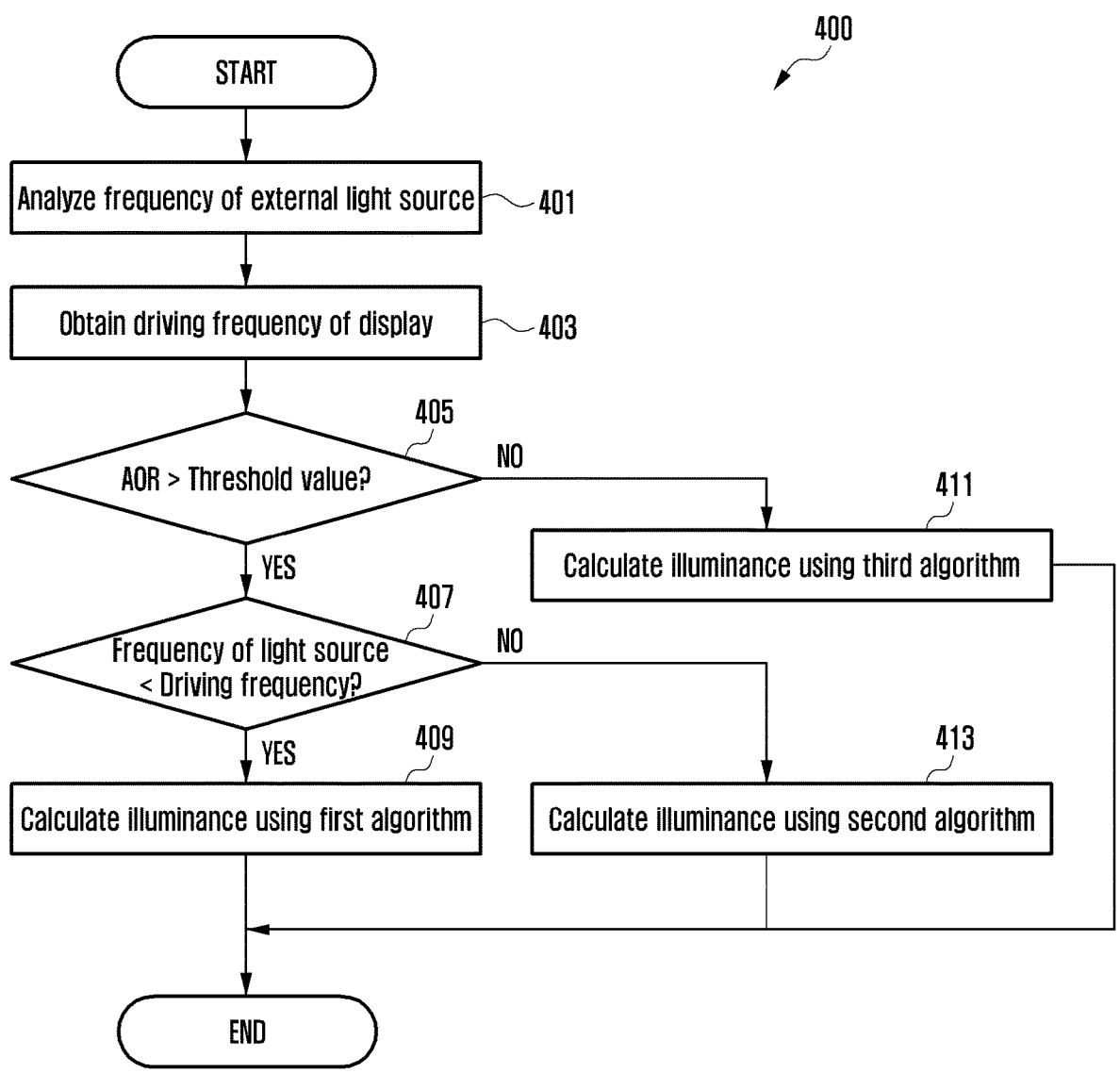
FIG. 4 is a flowchart illustrating an operation method of an electronic device according to an embodiment of the disclosure.

FIG. 4 is a flowchart 400 illustrating an operation method of an electronic device according to an embodiment of the disclosure.

Referring to FIG. 4, in operation 401, a processor (e.g., a processor 120 in FIG. 1) of an electronic device (e.g., an electronic device 101 in FIG. 1) according to various embodiments may analyze a frequency of an external light source (or a surrounding light source). In an embodiment, the external light source may include a DC light source or an AC light source. The DC light source is a light source in which the light intensity is consistently maintained over time and may include, for example, a white LED (WLED). In another embodiment, the AC light source is a light source in which the light intensity increases and decreases over time or that is turned on/off repeatedly and may include a fluorescent lamp, an incandescent lamp, a halogen lamp, an interior lamp, or the like. In yet another embodiment, the processor 120 may analyze a frequency of the external light source, based on a sensing value sensed by the light-measuring sensor (e.g., the light-measuring sensor 250 in FIGS. 2A and 2B). The frequency of the external light source may indicate an "operating frequency" of the external light source. The following operations may be performed when the external light source is an AC light source and when the light-measuring sensor 250 and the processor 120 (or the display driving circuit) are synchronized. For example, the AC light source may include a sine wave light source or a square wave light source.

Hereinafter, although the operations will be described as being performed by the processor 120, the display driving circuit (e.g., the display driving circuit 210 in FIGS. 2A and 2B) may selectively perform the operations. For example, the display driving circuit 210 may perform the following operations, instead of the processor 120, while the processor 120 is in an inactive (e.g., sleep) state.

According to some embodiments, an electrical path for synchronization of timing may be established (or connected) between the light-measuring sensor 250 and the display driving circuit 210. In an embodiment, the light-measuring sensor 250 and the display driving circuit 210 may be synchronized with each other so that the light-measuring sensor 250 may recognize a synchronization signal of the display and/or an off period of time of the display. In an embodiment, the light-measuring sensor 250 may adjust a sensing time for measuring light, based on the synchronization signal of the display and/or the off period of time of the display.

In operation 403, the processor 120 (or the display driving circuit 210) may obtain a display operation period. In another embodiment, the display operation period may indicate an operation in which the display module 160 is turned on/off during one duty cycle (or one frame). In still another embodiment, the display operation period may be determined based on a display driving frequency (or a screen refresh rate). For example, if the display driving frequency is 60 Hz, the display operation period may be to repeat an on/off operation at least one of 4 times, 2 times, or 1 time during one duty cycle (e.g., 16.67 ms). Alternatively, if the display driving frequency is 120 Hz, the display operation period may be to repeat an on/off operation twice or once during one duty cycle (e.g., 8.33 ms). The processor 120 may determine the display operation period, based on the display driving frequency, or obtain the display operation period from the display driving circuit 210.

In operation 405, the processor 120 (or the display driving circuit 210) may determine whether or not the AOR exceeds a threshold value. The AOR may indicate a ratio of an off period of time of the display module 160 during one duty cycle. For example, the processor 120 may obtain the off period of time of the display module 160 by multiplying 1 duty cycle by the AOR. In an embodiment, the processor 120 may calculate the AOR, based on the display operating frequency and the display operation period. In another embodiment, the processor 120 may perform operation 407 if the AOR exceeds the threshold value and perform operation 411 if the AOR is less than or equal to the threshold value.

If the AOR exceeds the threshold value, the processor 120 (or the display driving circuit 210) may determine whether or not the frequency of the external light source is less than the display operation period in operation 407. The frequency of the external light source (or the operating frequency of the external light source) may include at least one of 240 hz, 120 hz, or 60 hz. The display operation period may include at least one of 240 hz (e.g., 60 Hz*4 duty or 120 hz*2 duty), 120 hz (e.g., 60 Hz*2 duty or 120 hz*1 duty), or 60 hz (e.g., 60 Hz*1 duty). The processor 120 may perform operation 409 if the frequency of the external light source is less than the display operation period and perform operation 413 if the frequency of the external light source is equal to or greater than the display operation period.

If the frequency of the external light source is less than the display operation period, the processor 120 (or the display driving circuit 210) may calculate illuminance (or an illuminance value) using a first algorithm (or a first illuminance measurement method) in operation 409. If the AOR exceeds the threshold value and if the frequency of the external light source is less than the display operation period, since the AOR is sufficient, the processor 120 may perform control such that the time for measuring illuminance is delayed based on the synchronization signal of the display to sense illuminance in the off period of time (or section) of the display. In yet another embodiment, the processor 120 may avoid the influence of the display module 160 in the case where the illuminance is sensed during the off period of time (or section) of the display. The first algorithm may be to calculate illuminance by averaging or summating the illuminance values sensed during the off period of time of the display, based on the synchronization signal of the display. The first algorithm will be described in detail with reference to FIG. 5.

If the frequency of the external light source is greater than or equal to the display operation period, the processor 120 may calculate illuminance using a second algorithm (or a second illuminance measurement method) in operation 413. If the AOR exceeds the threshold value and if the frequency of the external light source is greater than or equal to the display operation period, since the AOR is sufficient, the processor 120 may perform control such that the time for measuring illuminance is delayed based on the synchronization signal of the display to sense illuminance during the off period of time (or section) of the display. In the case where the frequency of the external light source is equal to or greater than the display operation period, if a minimum value of the external light source overlaps the off period of time of the display, the average or sum of the sensed illuminance values may be reduced, causing accurate measurement of illuminance to be difficult. In still another embodiment, the processor 120 may calculate illuminance according to a second algorithm, which is different from the first algorithm, if the AOR exceeds the threshold value and if the frequency of the external light source is greater than or equal to the display operation period. For example, the second algorithm may be to calculate illuminance using an illuminance value sensed first during the display operation period, based on the synchronization signal of the display, and a median value of a plurality of illuminance values sensed at intervals of a sensing interval timing during the display operation period. In an embodiment, the second algorithm will be described in detail with reference to FIG. 7.

If the AOR is less than or equal to the threshold value, the processor 120 (or the display driving circuit 210) may calculate illuminance (or an illuminance value) using a third algorithm (or third illuminance measurement method) in operation 411. If the AOR is less than or equal to the threshold value, it may be difficult for the processor 120 to measure illuminance during the off period of time of the display because the off period of time of the display is shorter than the sensing period of the light-measuring sensor 250. In the case where the AOR is less than or equal to the threshold value, the processor 120 may calculate illuminance according to a third algorithm different from the first algorithm or second algorithm. For example, the third algorithm may be to calculate illuminance based on a maximum value and a minimum value of a plurality of illuminance values sensed close to the off period of time of the display, based on the synchronization signal of the display, and a plurality of illuminance values sensed in the rest of the display operation period. In an embodiment, the third algorithm will be described in detail with reference to FIG. 9.

Figure 5:
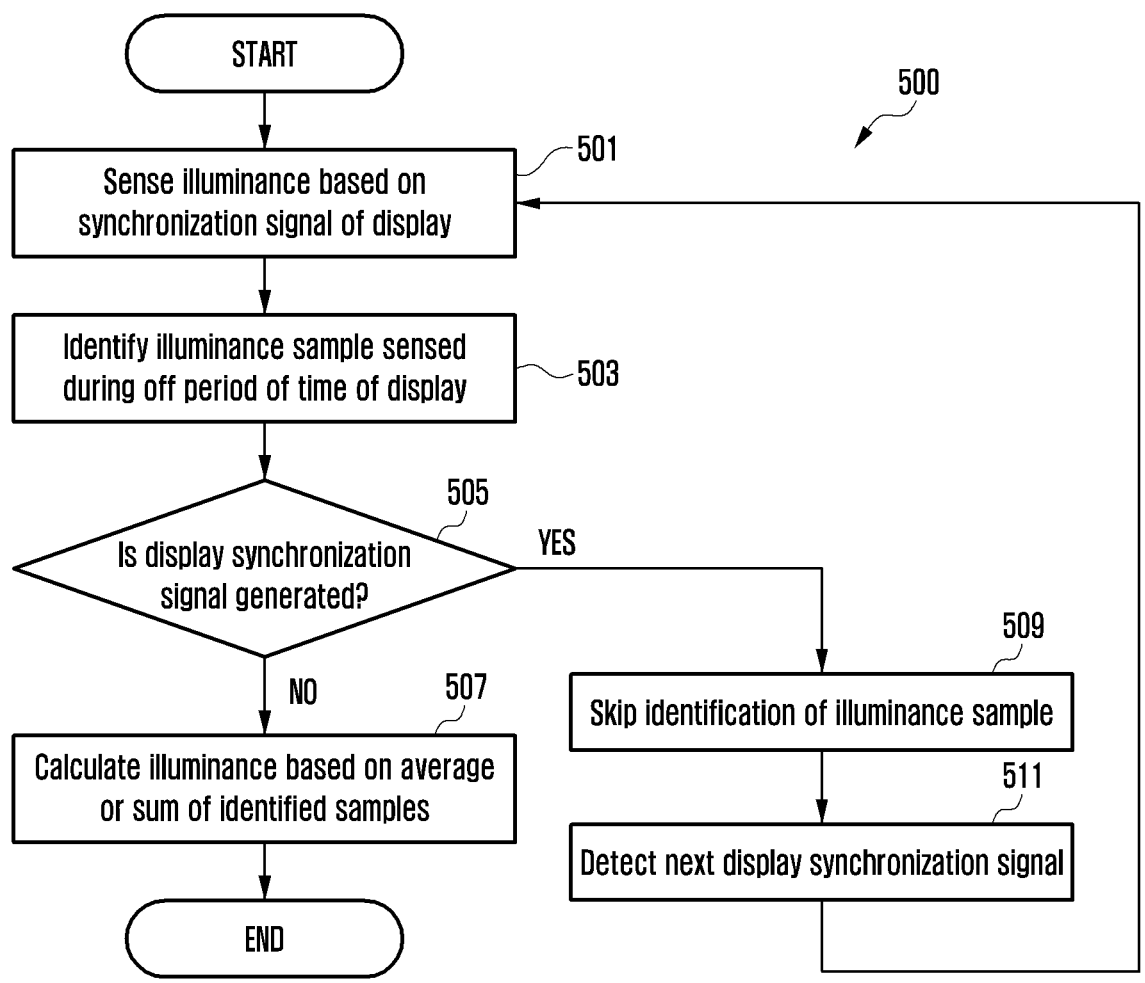
FIG. 5 is a flowchart illustrating a first illuminance measurement method of an electronic device according to an embodiment of the disclosure.

FIG. 5 is a flowchart 500 illustrating a first illuminance measurement method of an electronic device according to an embodiment of the disclosure. FIG. 5 shows details of operation 409 in FIG. 4.

Referring to FIG. 5, in operation 501, a processor (e.g., a processor 120 in FIG. 1) of an electronic device (e.g., an electronic device 101 in FIG. 1) according to various embodiments may perform control to sense illuminance, based on a synchronization signal of a display. A light-measuring sensor (e.g., the light-measuring sensor 250 in FIGS. 2A and 2B) may determine a sensing start timing (e.g., the sensing start timing 371 in FIG. 3B), based on a synchronization signal (e.g., the first synchronization signal 311 in FIG. 3B) obtained from the display (e.g., the display module 160 in FIG. 1). In an embodiment, the sensing start timing 371 may indicate the time at which sensing is performed after a predetermined time delay from the start time of the first synchronization signal 311. In another embodiment, the light-measuring sensor 250 may determine a sensing interval timing 373 for sensing from the sensing start timing 371 until a next synchronization signal (e.g., the second synchronization signal 315 in FIG. 3B) is obtained. The sensing interval timing 373 may indicate the interval between first sensing and second sensing. The light-measuring sensor 250 may determine how many illuminance samples (e.g., the number of illuminance samples 375) are to be obtained during the display operation period. In yet an embodiment, the light-measuring sensor 250 may sense illuminance, based on the sensing interval timing 373, from the sensing start timing 371 to obtain a specified number of illuminance samples during the display operation period. The processor 120 may obtain a plurality of sensed illuminance samples from the light-measuring sensor 250 and store the same in a memory (e.g., the memory 130 in FIG. 1). The light-measuring sensor 250 may store the plurality of sensed illuminance samples in a sensor memory buffer (not shown).

In operation 503, the processor 120 may identify (or obtain) an illuminance sample (or an illuminance value) sensed during an off period of time of the display. In an embodiment, he processor 120 may identify an illuminance sample (or an illuminance value) sensed during the off period of time of the display from among the plurality of illuminance samples sensed by the light-measuring sensor 250. The processor 120 may identify an illuminance sample (or an illuminance value) sensed during the off period of time of the display from among the plurality of illuminance samples stored in the memory 130 or stored in the sensor memory buffer.

In operation 505, the processor 120 may determine whether or not a synchronization signal of the display is generated during the sensing interval timing 373. According to a comparative example, if a synchronization signal of the display is generated during the sensing interval timing 373, the processor 120 may use the illuminance sample sensed during an on period of time of the display in calculation of illuminance. In the case where the illuminance sample sensed during the on period of time of the display is used in calculation of illuminance, the accuracy of the illuminance calculation may be lowered.

According to some embodiments, the processor 120 may determine whether or not a synchronization signal of the display is generated during the sensing interval timing. In an embodiment, the processor 120 may perform operation 509 if a synchronization signal of the display is generated during the sensing interval timing and perform operation 507 if the synchronization signal of the display is not generated during the sensing interval timing.

If a synchronization signal of the display is not generated during the sensing interval timing, the processor 120 may calculate illuminance, based on an average or sum of the identified illuminance samples (e.g., a sum of the illuminance samples sensed during the off period of time of the display) in operation 507. In another embodiment, the processor 120 may identify illuminance samples for a predetermined period (e.g., one duty cycle) from among the plurality of illuminance samples stored in the memory 130 or stored in the sensor memory buffer and calculate, as illuminance, an average of the identified illuminance samples, or calculate, as illuminance, a sum of the identified illuminance samples.

If a synchronization signal of the display is generated during the sensing interval timing, the processor 120 may skip (or omit) the identification (acquisition) of illuminance samples in operation 509. In still another embodiment, the processor 120 may skip the identification (acquisition) of illuminance samples during the duty cycle of the display.

In operation 511, the processor 120 may detect a next synchronization signal of the display. If a next synchronization signal (e.g., the second synchronization signal) of the display is detected, the processor 120 may return to operation 501 and perform control to sense illuminance after the next synchronization signal.

Figure 6A:
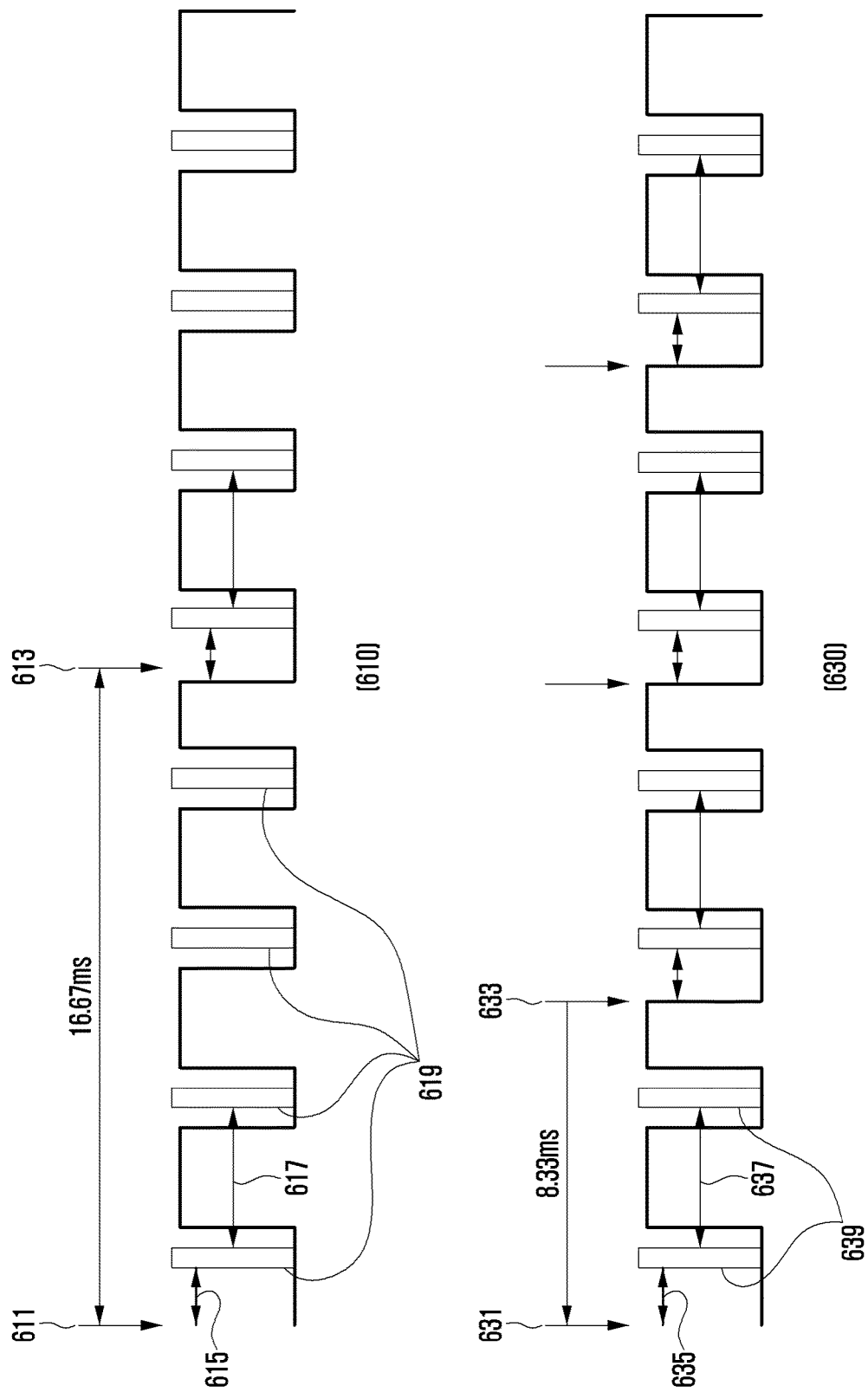
FIGS. 6A, 6B, and 6C are diagrams illustrating an example of measuring illuminance, based on a first illuminance measurement method according to various embodiments of the disclosure.
Figure 6B:
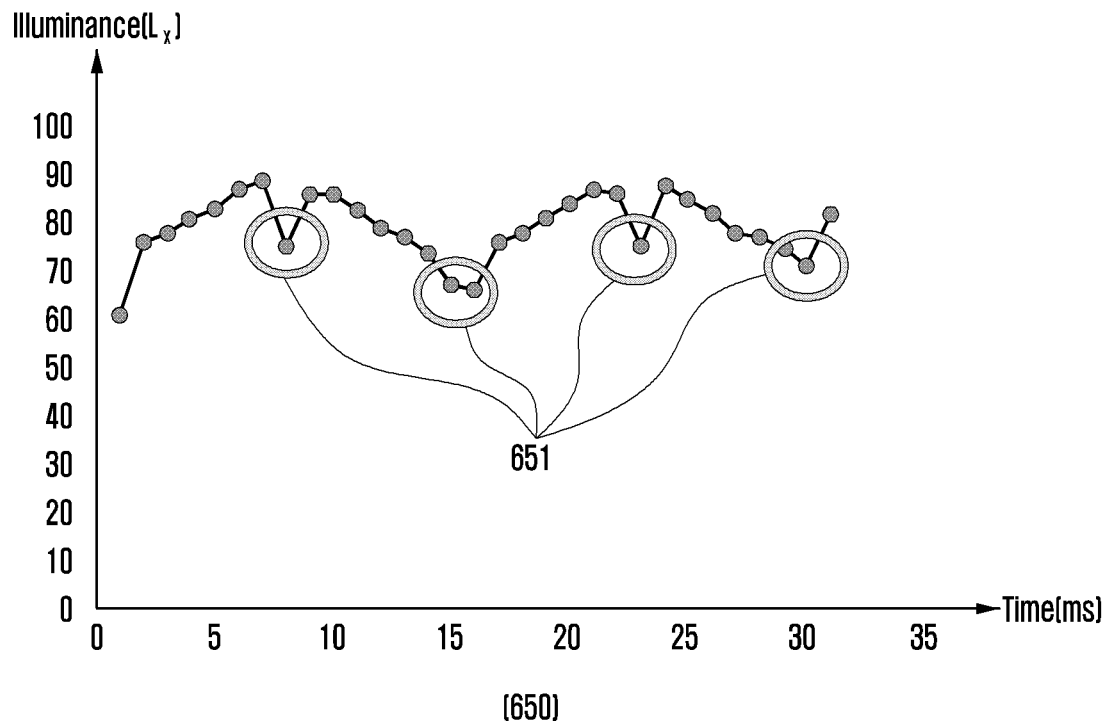
Figure 6B:
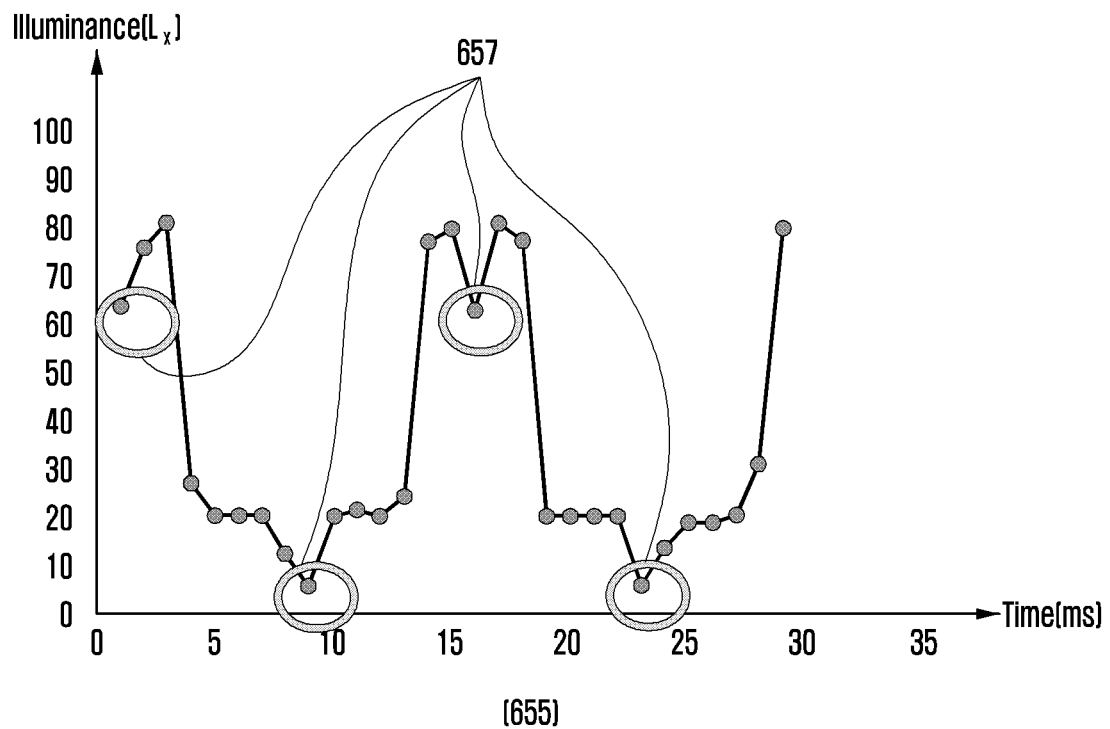
Figure 6C:
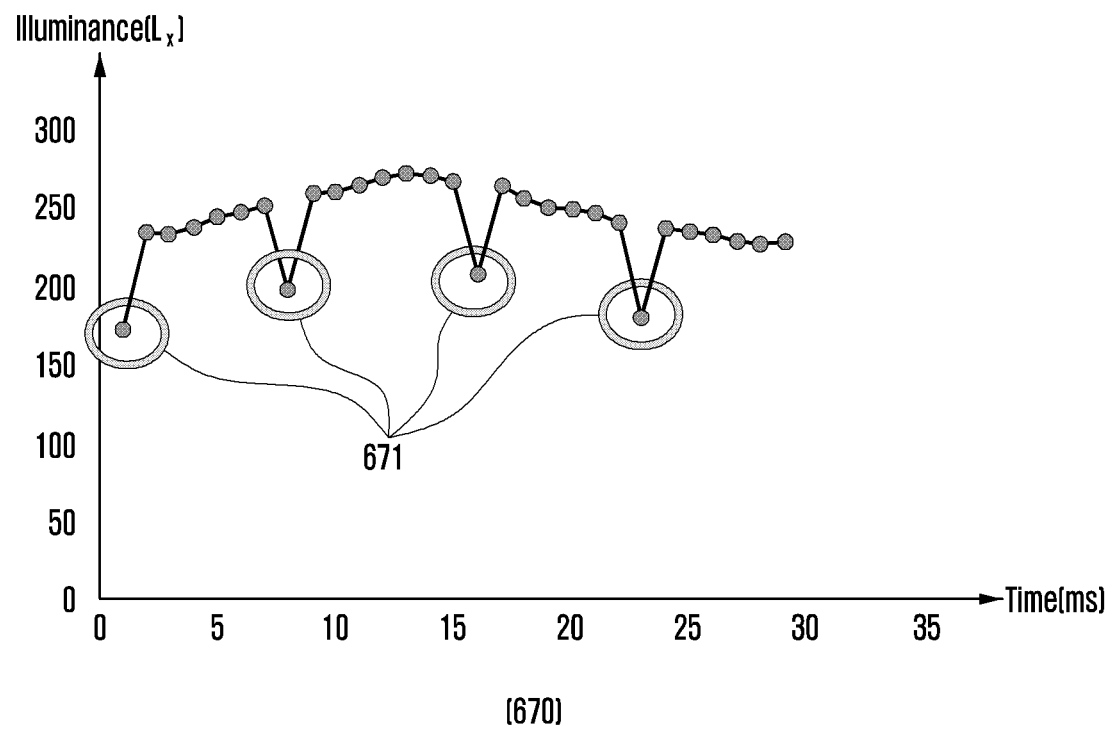
Figure 6C:
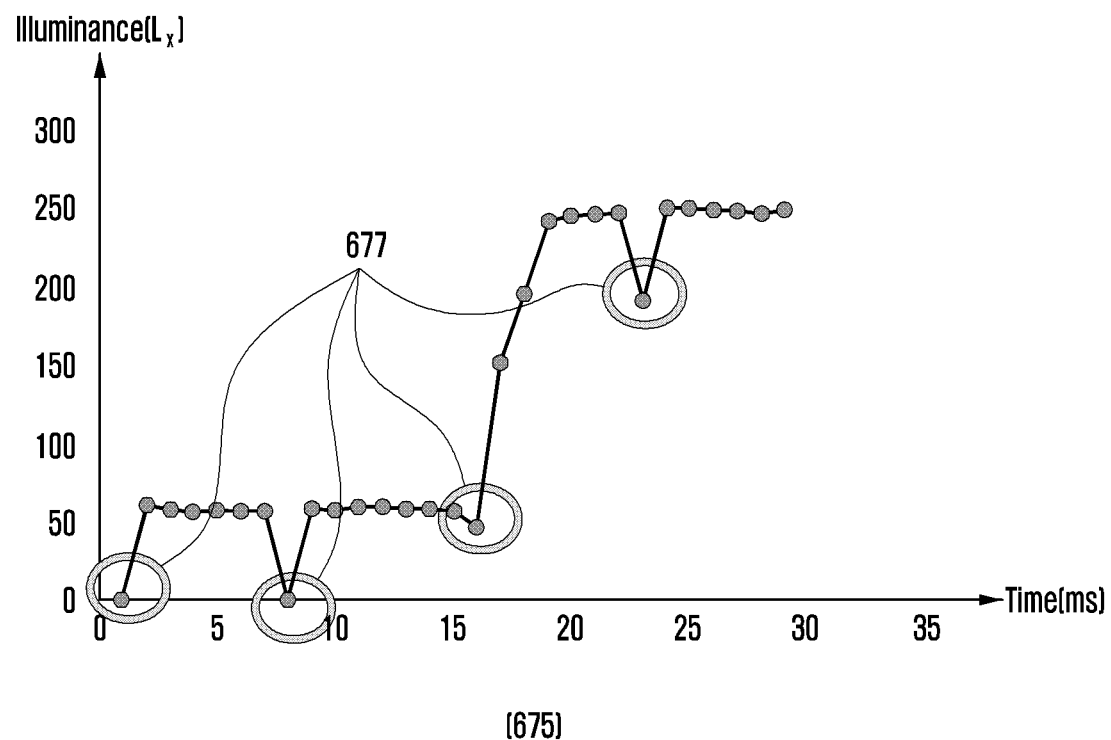

FIGS. 6A to 6C are diagrams illustrating an example of measuring illuminance, based on a first illuminance measurement method according to various embodiments of the disclosure.

FIG. 6A is a diagram illustrating an example of calculating illuminance in a first illuminance measurement method according to a display operation period.

Referring to FIG. 6A, a processor (e.g., a processor 120 in FIG. 1) of an electronic device (e.g., an electronic device 101 in FIG. 1) according to various embodiments may perform control such that illuminance sensing is performed after a predetermined time delay 615 from a first synchronization signal 611 in a display operation period 610 for operation at 60 hz*4 duty (e.g., 240 hz) when the frequency of an AC light source is 120 hz or 60 hz. In an embodiment, the processor 120 may identify a plurality of illuminance samples 619 sensed during an off period of time of the display. The plurality of illuminance samples 619 may indicate illuminance values sensed at a sensing interval timing 617 during an off period of time of the display until a second synchronization signal 613 is obtained. In another embodiment, the processor 120 may calculate an average or sum of the plurality of illuminance samples 619 as illuminance.

According to various embodiments, the processor 120 may identify a plurality of illuminance samples 639 sensed during an off period of time of the display after a predetermined time delay 635 from a first synchronization signal 631 in a display operation period 630 for operation at 120 hz*2 duty (e.g., 240 hz) when the frequency of an AC light source is 120 hz or 60 hz. The plurality of illuminance samples 639 may indicate illuminance values sensed at a sensing interval timing 637 during an off period of time of the display until a second synchronization signal 633 is obtained. In an embodiment, the processor 120 may calculate an average or sum of the plurality of illuminance samples 639 as illuminance.

FIG. 6B is a graph showing illuminance measured when the frequency of an AC light source is less than a display operation period.

Referring to FIG. 6B, a first illuminance graph 650 represents an illuminance sample (or illuminance value) sensed in a display operation period 610 for operation at 60 hz*4 duty (e.g., 240 hz) or in a display operation period 630 for operation at 120 hz*2 duty (e.g., 240 hz) when the frequency of a first AC light source is 120 hz. The processor 120 may identify a plurality of illuminance samples 651 sensed during an off period of time of the display and calculate an average or sum of the plurality of illuminance samples 651 as illuminance. In an embodiment, the illuminance samples not given reference numerals may indicate illuminance samples sensed during an on period of time of the display.

According to some embodiments, a second illuminance graph 655 represents an illuminance sample (or illuminance value) sensed in a display operation period 610 for operation at 60 hz*4 duty (e.g., 240 hz) or in a display operation period 630 for operation at 120 hz*2 duty (e.g., 240 hz) when the frequency of a second AC light source is 120 hz. In another embodiment, the processor 120 may identify a plurality of illuminance samples 657 sensed during an off period of time of the display and calculate an average or sum of the plurality of illuminance samples 657 as illuminance. The illuminance samples not given reference numerals may indicate illuminance samples sensed during an on period of time of the display.

FIG. 6C is another graph showing illuminance measured when the frequency of an AC light source is less than a display operation period.

Referring to FIG. 6C, a third illuminance graph 670 represents an illuminance sample (or illuminance value) sensed in a display operation period 610 for operation at 60 hz*4 duty (e.g., 240 hz) or in a display operation period 630 for operation at 120 hz*2 duty (e.g., 240 hz) when the frequency of a first AC light source is 60 hz. In yet another embodiment, the processor 120 may identify a plurality of illuminance samples 671 sensed during an off period of time of the display and calculate an average or sum of the plurality of illuminance samples 671 as illuminance. The illuminance samples not given reference numerals may indicate illuminance samples sensed during an on period of time of the display.

According to some embodiments, a fourth illuminance graph 675 represents an illuminance sample (or illuminance value) sensed in a display operation period 610 for operation at 60 hz*4 duty (e.g., 240 hz) or in a display operation period 630 for operation at 120 hz*2 duty (e.g., 240 hz) when the frequency of a second AC light source is 60 hz. In an embodiment, the processor 120 may identify a plurality of illuminance samples 677 sensed during an off period of time of the display and calculate an average or sum of the plurality of illuminance samples 677 as illuminance. The illuminance samples not given reference numerals may indicate illuminance samples sensed during an on period of time of the display.

If the display operation period is 60 hz*2 duty (e.g., 120 hz) or 120 hz*1 duty (e.g., 120 hz) when the frequency of an AC light source is 60 hz, a first algorithm (or first illuminance measurement method) may sense illuminance after a predetermined time delay 615 from a first synchronization signal 611 (e.g., VSYNC) and sense illuminance at intervals of the sensing interval timing 617 in the off period of time of the display. If a second synchronization signal 613 (e.g., VSYNC) is received while the sensing interval timing 617 is in progress, the processor 120 may skip sensing data in the subsequent display operation period, when a next third synchronization signal (e.g., VSYNC) is received, sense illuminance after changing the register with a predetermined time delay 615, and FIFO (first-in and first-out)-read the illuminance sensed for a predetermined period (e.g., the sensing interval timing 617), thereby outputting the illuminance as an average of the illuminances or a sum of the illuminances (e.g., illuminance=FIFO DATA AVG or FIFO DATA SUM).

Figure 7:
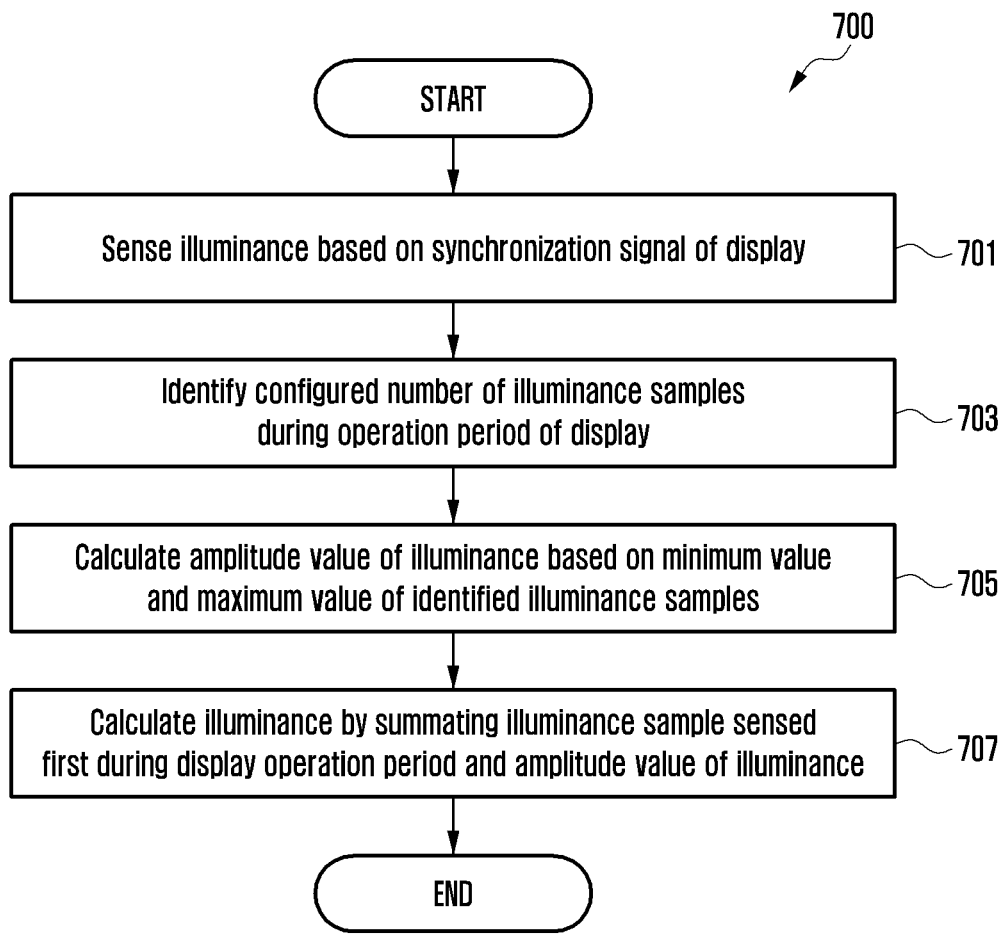
FIG. 7 is a flowchart illustrating a second illuminance measurement method of an electronic device according to an embodiment of the disclosure.

FIG. 7 is a flowchart 700 illustrating a second illuminance measurement method of an electronic device according to an embodiment of the disclosure. FIG. 7 shows details of operation 413 in FIG. 4.

Referring to FIG. 7, in operation 701, a processor (e.g., a processor 120 in FIG. 1) of an electronic device (e.g., an electronic device 101 in FIG. 1) according to various embodiments may perform control to sense illuminance, based on a synchronization signal of a display. A light-measuring sensor (e.g., the light-measuring sensor 250 in FIGS. 2A and 2B) may sense illuminance from the sensing start timing 371, based on the sensing interval timing 373, to obtain a specified number of illuminance samples during a display operation period. In an embodiment, the processor 120 may obtain a plurality of sensed illuminance samples from the light-measuring sensor 250 and store the same in a memory (e.g., the memory 130 in FIG. 1). In another embodiment, the light-measuring sensor 250 may store the plurality of sensed illuminance samples in a sensor memory buffer. Since operation 701 is the same as or similar to operation 501, a detailed description thereof will be omitted.

In operation 703, the processor 120 may identify (or obtain) a configured number of illuminance samples during an operation period of the display. The display operation period may vary depending on the display driving frequency. The display operation period may be to repeat on/off at least one of four times, two times, or one time during one duty cycle when the display driving frequency is 60 Hz. Alternatively, the display operation period may be to repeat on/off twice or once during one duty cycle when the display driving frequency is 120 Hz. For example, the processor 120 identify, excluding an illuminance sample sensed first during a single display operation period (e.g., a first display operation period), a configured number of (e.g., n) illuminance samples from a plurality of illuminance samples sensed at intervals of the sensing interval timing 373 during the first display operation period.

In operation 705, the processor 120 may calculate an amplitude value of illuminance, based on a minimum value and a maximum value of the identified illuminance samples. In an embodiment, the processor 120 may apply variables to an average of a value obtained by subtracting the minimum value from the maximum value of the plurality of illuminance samples, thereby calculating the amplitude value of illuminance. For example, the amplitude value (e.g., delta) of illuminance may be obtained as a*(maximum value (e.g., max)−minimum value (e.g., min))/2+b. Here, a and b may be preset as variables.

In operation 707, the processor 120 may calculate illuminance by summating the illuminance sample sensed first during the display operation period and the amplitude value of the illuminance. For example, if the AOR exceeds a threshold value and if the frequency of the external light source is greater than or equal to the display operation period, the processor 120 may calculate illuminance by summating the illuminance sample sensed first during a first display operation period, based on a synchronization signal of the display, and an amplitude value of the illuminance samples sensed at intervals of the sensing interval timing 373 during the first display operation period.

FIGS. 8A to 8D are diagrams illustrating an example of measuring illuminance, based on a second illuminance measurement method according to various embodiments of the disclosure.

Figure 8A:
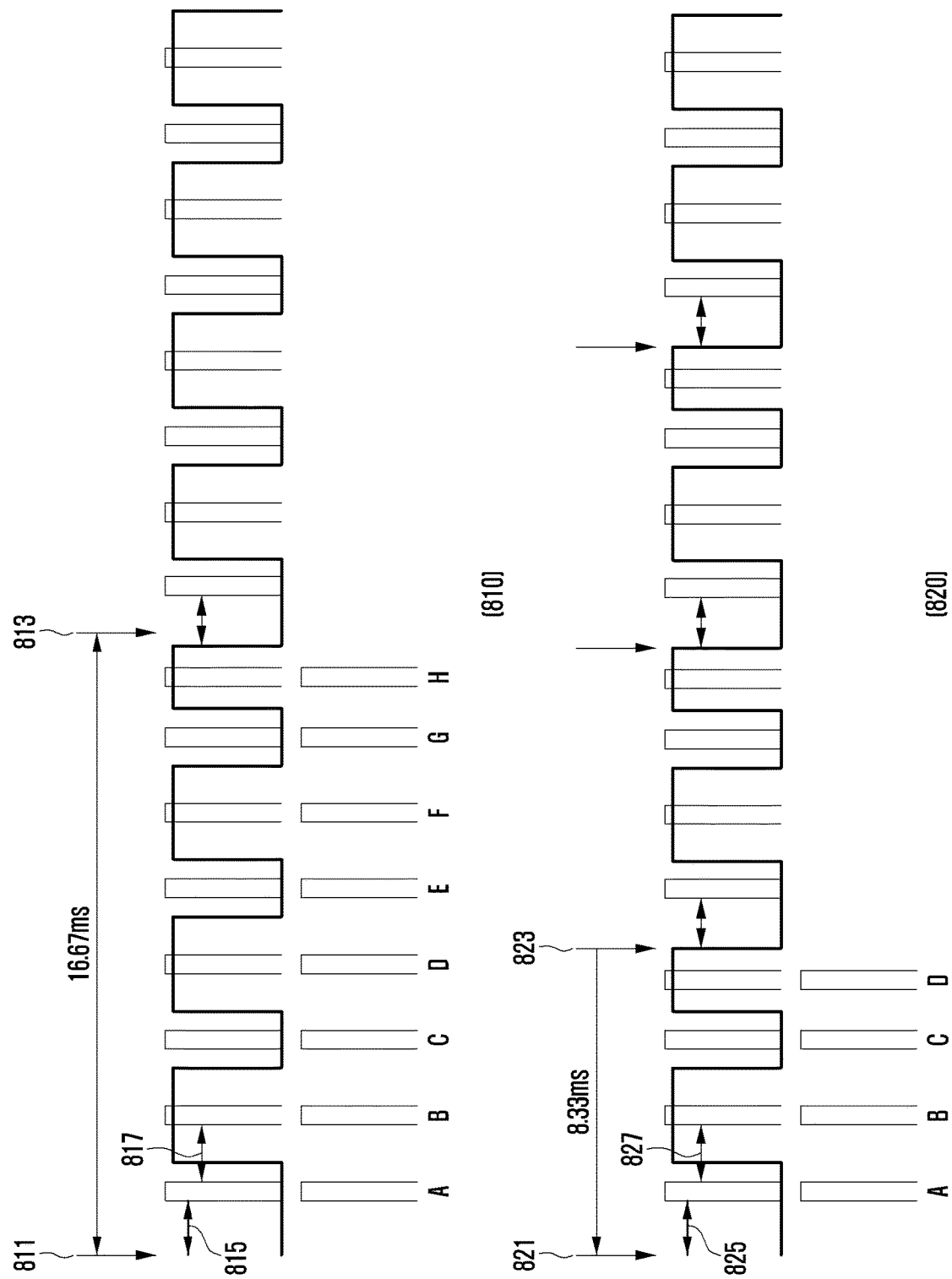

FIG. 8A is a diagram illustrating an example of calculating illuminance in a second illuminance measurement method according to a display operation period.

Referring to FIG. 8A, a processor (e.g., a processor 120 in FIG. 1) of an electronic device (e.g., an electronic device 101 in FIG. 1) according to various embodiments may perform control such that illuminance sensing is performed after a predetermined time delay 815 from a first synchronization signal 811 in a display operation period 810 for operation at 60 hz*4 duty (e.g., 240 hz) when the frequency of an AC light source is 240 hz. In an embodiment, the processor 120 may identify a first illuminance sample A sensed first in one display operation period (e.g., 16.67 ms). In another embodiment, the processor 120 may identify a configured number of illuminance samples (e.g., B to H) during the display operation period (e.g., 16.67 ms). For example, the configured number of illuminance samples B to H may include illuminance samples sensed at a sensing interval timing 817 until a second synchronization signal 813 is obtained. In yet another embodiment, the processor 120, based on a maximum value and a minimum value of the configured number of illuminance samples B to H, may calculate a median value of the illuminance samples sensed at the sensing interval timing 817 during the display operation period. The processor 120 may calculate illuminance by summating the first illuminance sample A and the median value of the illuminance samples (e.g., an amplitude value of illuminance).

According to various embodiments, the processor 120 may perform control such that illuminance sensing is performed after a predetermined time delay 825 from a first synchronization signal 821 in a display operation period 820 for operation at 120 hz*2 duty (e.g., 240 hz) when the frequency of an AC light source is 240 hz. The processor 120 may identify a first illuminance sample A sensed first during a display operation period (e.g., 8.33 ms). In an embodiment, the processor 120 may identify a configured number of illuminance samples (e.g., B to D) during the display operation period. For example, the plurality of illuminance samples B to D may include the illuminance samples B to D sensed at a sensing interval timing 827 until a second synchronization signal 823 is obtained. In another embodiment, the processor 120 may calculate a median value of the plurality of illuminance samples B to D, based on a maximum value and a minimum value of the plurality of illuminance samples B to D. The processor 120 may calculate the illuminance by summating the first illuminance sample A and the median value of the illuminance samples B to D (e.g., an amplitude value of illuminance).

Figure 8B:
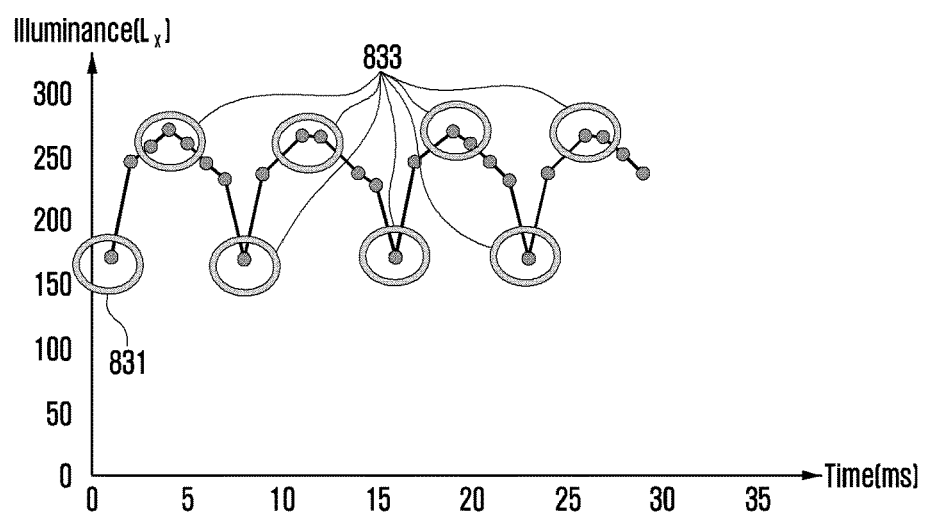
Figure 8B:
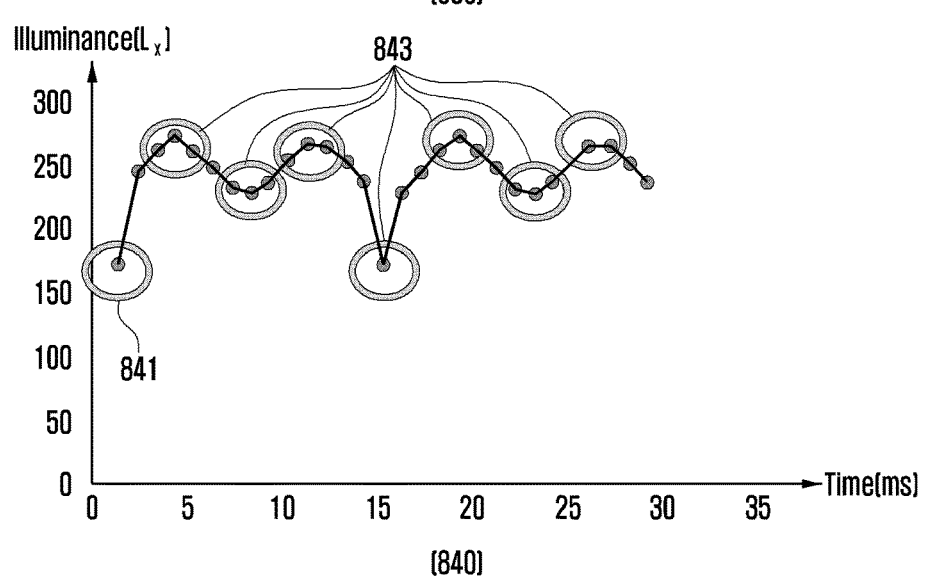
Figure 8B:
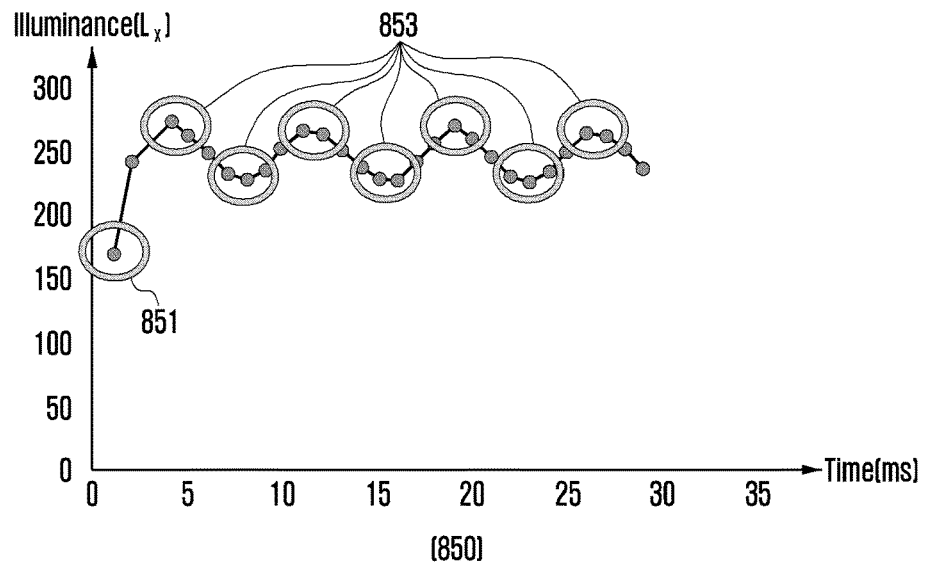

FIG. 8B is a graph showing measured illuminance when the frequency of an AC light source is greater than or equal to a display operation period.

Referring to FIG. 8B, a first illuminance graph 830 represents an illuminance sample (or illuminance value) sensed in a display operation period for operation at 60 hz*4 duty (e.g., 240 hz) (or 120 hz*2 duty) when the frequency of an AC light source is 240 hz. A first illuminance sample 831 may be an illuminance value sensed first during the display operation period, and a plurality of illuminance samples 833 may indicate illuminance values sensed at sensing timing intervals during the display operation period. In the case of a display operation period in which the display operates at 60 hz*4 duty (e.g., 240 hz), the first illuminance sample 831 may be an illuminance value A sensed first during the display operation period (e.g., 16.67 ms), and the plurality of illuminance samples 833 may indicate illuminance values B to H sensed at the sensing interval timing 817 during the display operation period (e.g., 16.67 ms). In the case of a display operation period in which the display operates at 120 hz*2 duty (e.g., 240 hz), the first illuminance sample 831 may be an illuminance value A sensed first during the display operation period (e.g., 8.33 ms), and the plurality of illuminance samples 833 may indicate illuminance values B to D sensed at the sensing interval timing 827 during the display operation period (e.g., 8.33 ms). In an embodiment, the processor 120 may calculate illuminance by summating the first illuminance sample 831 and a median value of the plurality of illuminance samples 833 (e.g., an amplitude value of illuminance).

A second illuminance graph 840 represents an illuminance sample (or illuminance value) sensed in a display operation period for operation at 60 hz*2 duty (e.g., 120 hz) when the frequency of an AC light source is 240 hz. A first illuminance sample 841 may be an illuminance value sensed first during the display operation period, and a plurality of illuminance samples 843 may indicate illuminance values sensed at a sensing interval timing during the display operation period. In another embodiment, the processor 120 may calculate illuminance by summating the first illuminance sample 841 and a median value of the plurality of illuminance samples 843 (e.g., an amplitude value of illuminance).

A third illuminance graph 850 represents an illuminance sample (or illuminance value) sensed in a display operation period for operation at 60 hz*1 duty (e.g., 60 hz) when the frequency of an AC light source is 240 hz. A first illuminance sample 851 may be an illuminance value sensed first during the display operation period, and a plurality of illuminance samples 853 may indicate illuminance values sensed at a sensing interval timing during the display operation period. In still another embodiment, the processor 120 may calculate illuminance by summating the first illuminance sample 851 and a median value of the plurality of illuminance samples 853 (e.g., an amplitude value of illuminance).

FIG. 8C is a diagram illustrating another example of calculating illuminance in a second illuminance measurement method according to a display operation period.

Referring to FIG. 8C, a processor 120 may perform control such that illuminance sensing is performed after a predetermined time delay 865 from a first synchronization signal 861 in a display operation period 860 for operation at 60 hz*2 duty (e.g., 120 hz) when the frequency of an AC light source is 120 hz. The processor 120 may identify a first illuminance sample A sensed first in the display operation period (e.g., 16.67 ms). In an embodiment, the processor 120 may identify a configured number of illuminance samples (e.g., B to H) during the display operation period (e.g., 16.67 ms). For example, the configured number of illuminance samples B to H may include illuminance samples sensed at a sensing interval timing 867 until a second synchronization signal 863 is obtained. In another embodiment, the processor 120, based on a maximum value and a minimum value of the configured number of illuminance samples B to H, may calculate a median value of the illuminance samples B to H. In yet another embodiment, the processor 120 may calculate illuminance by summating the first illuminance sample A and the median value of the illuminance samples B to H (e.g., an amplitude value of illuminance).

According to some embodiments, the processor 120 may perform control such that illuminance sensing is performed after a predetermined time delay 875 from a first synchronization signal 871 in a display operation period 870 for operation at 120 hz*1 duty (e.g., 120 hz) when the frequency of an AC light source is 120 hz. The processor 120 may identify a first illuminance sample A sensed first in the display operation period (e.g., 8.33 ms). The processor 120 may identify a configured number of illuminance samples (e.g., B to D) during the display operation period. For example, the plurality of illuminance samples B to D may include illuminance samples sensed at a sensing interval timing 877 until a second synchronization signal 873 is obtained. The processor 120, based on a maximum value and a minimum value of the plurality of illuminance samples B to D, may calculate a median value of the plurality of illuminance samples B to D. The processor 120 may calculate illuminance by summating the first illuminance sample A and the median value of the plurality of illuminance samples B to D (e.g., an amplitude value of illuminance).

According to other embodiments, in a display operation period (e.g., the fifth driving scheme 350 in FIG. 3A) for operation at 60 hz*1 duty (e.g., 60 hz) when the frequency of an AC light source is 120 hz, the first illuminance sample A may be an illuminance value A sensed first during the display operation period (e.g., 16.67 ms), and the plurality of illuminance samples may indicate illuminance values B to H sensed at the sensing interval timing 817 during the display operation period (e.g., 16.67 ms).

Figure 8D:
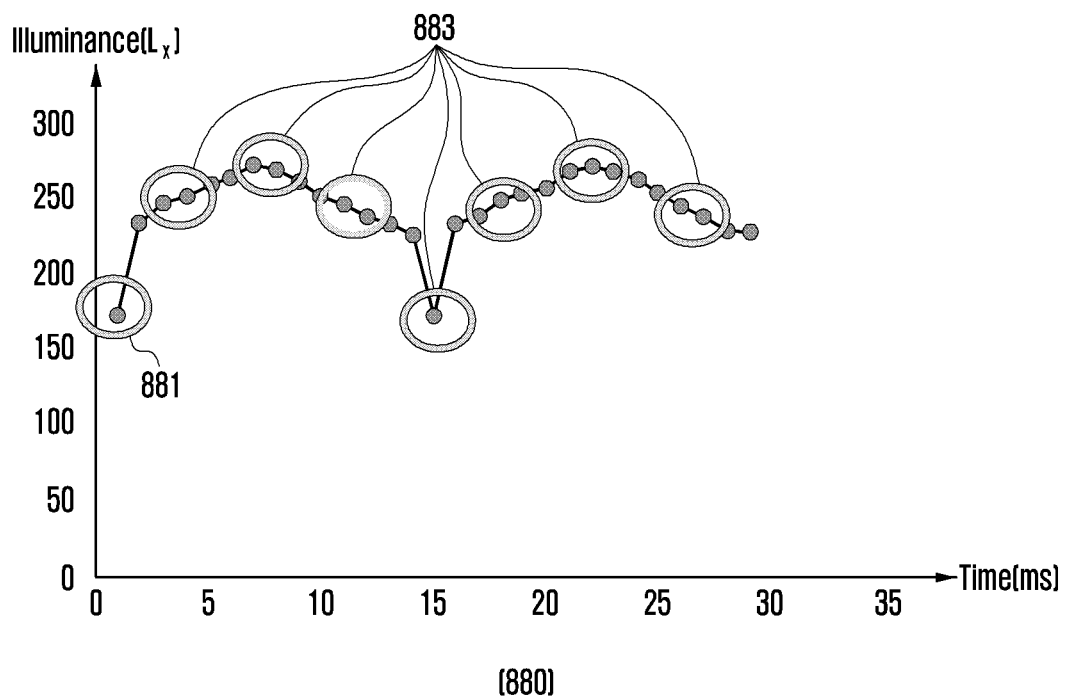
Figure 8D:
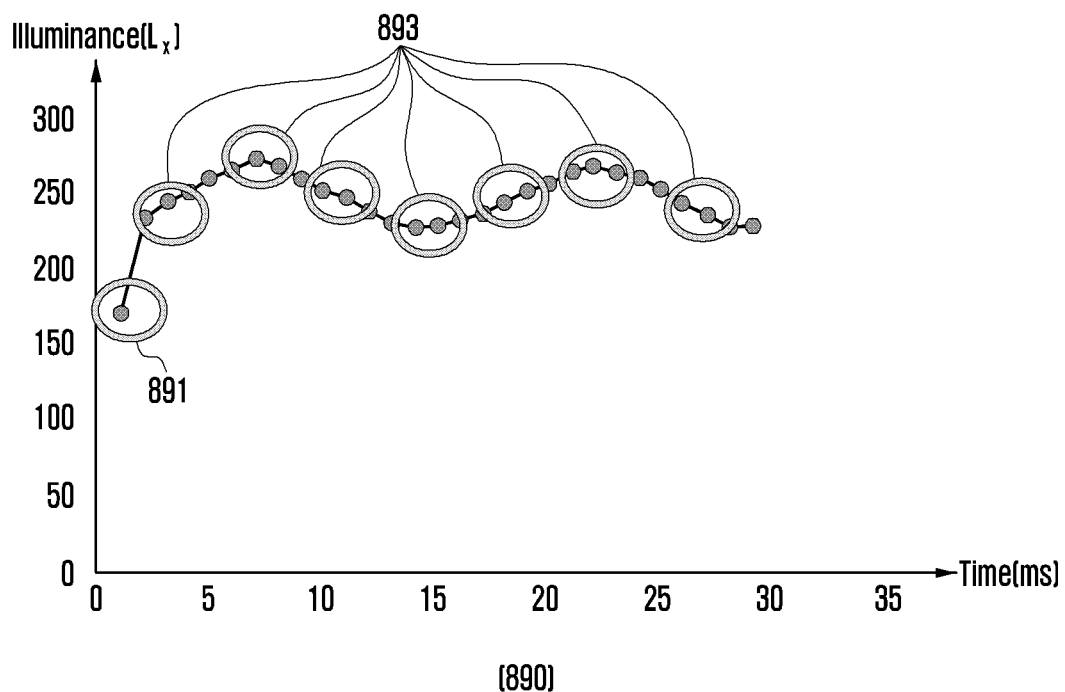

FIG. 8D is another graph showing measured illuminance when the frequency of an AC light source is greater than or equal to a display operation period.

Referring to FIG. 8D, a fourth illuminance graph 880 represents an illuminance sample (or illuminance value) sensed in a display operation period for operation at 60 hz*2 duty (e.g., 120 hz) when the frequency of an AC light source is 120 hz. A first illuminance sample 881 may be an illuminance value A sensed first during the display operation period (e.g., 16.67 ms), and a plurality of illuminance samples 883 may indicate illuminance values B to H sensed at a sensing interval timing during the display operation period (e.g., 16.67 ms). In an embodiment, the processor 120 may calculate illuminance by summating the first illuminance sample 881 and a median value of the plurality of illuminance samples 883 (e.g., an amplitude value of illuminance).

A fifth illuminance graph 890 represents an illuminance sample (or illuminance value) sensed in a display operation period for operation at 60 hz*1 duty (e.g., 60 hz) when the frequency of an AC light source is 120 hz. A first illuminance sample 891 may be an illuminance value sensed first during the display operation period (e.g., 8.33 ms), and a plurality of illuminance samples 893 may indicate illuminance values sensed at a sensing interval timing during the display operation period (e.g., 8.33 ms). In an embodiment, the processor 120 may calculate illuminance by summating the first illuminance sample 891 and a median value of the plurality of illuminance samples 843 (e.g., an amplitude value of illuminance).

According to various embodiments, if the display operation period is 60 hz*1 duty (e.g., 60 hz) when the frequency of an AC light source is 60 hz, a second algorithm (or second illuminance measurement method) may sense first illuminance after a predetermined time delay 865 from a first synchronization signal 861 (e.g., VSYNC), sense illuminance at intervals of a sensing interval timing 857, sequentially store the same in a memory (e.g., the memory 130 in FIG. 1) in a FIFO manner, and outputting illuminance by summating the first illuminance value and a median value of a plurality of illuminance values (e.g., an amplitude value of illuminance) sensed at the sensing interval timing 857. (e.g., illuminance=A (first illuminance value)+Delta (median value of multiple illuminance values), Delta=a*(Max (maximum value among multiple illuminance values)−Min (minimum value among multiple illuminance values))/2+b (a and b are coefficients)).

Figure 9:
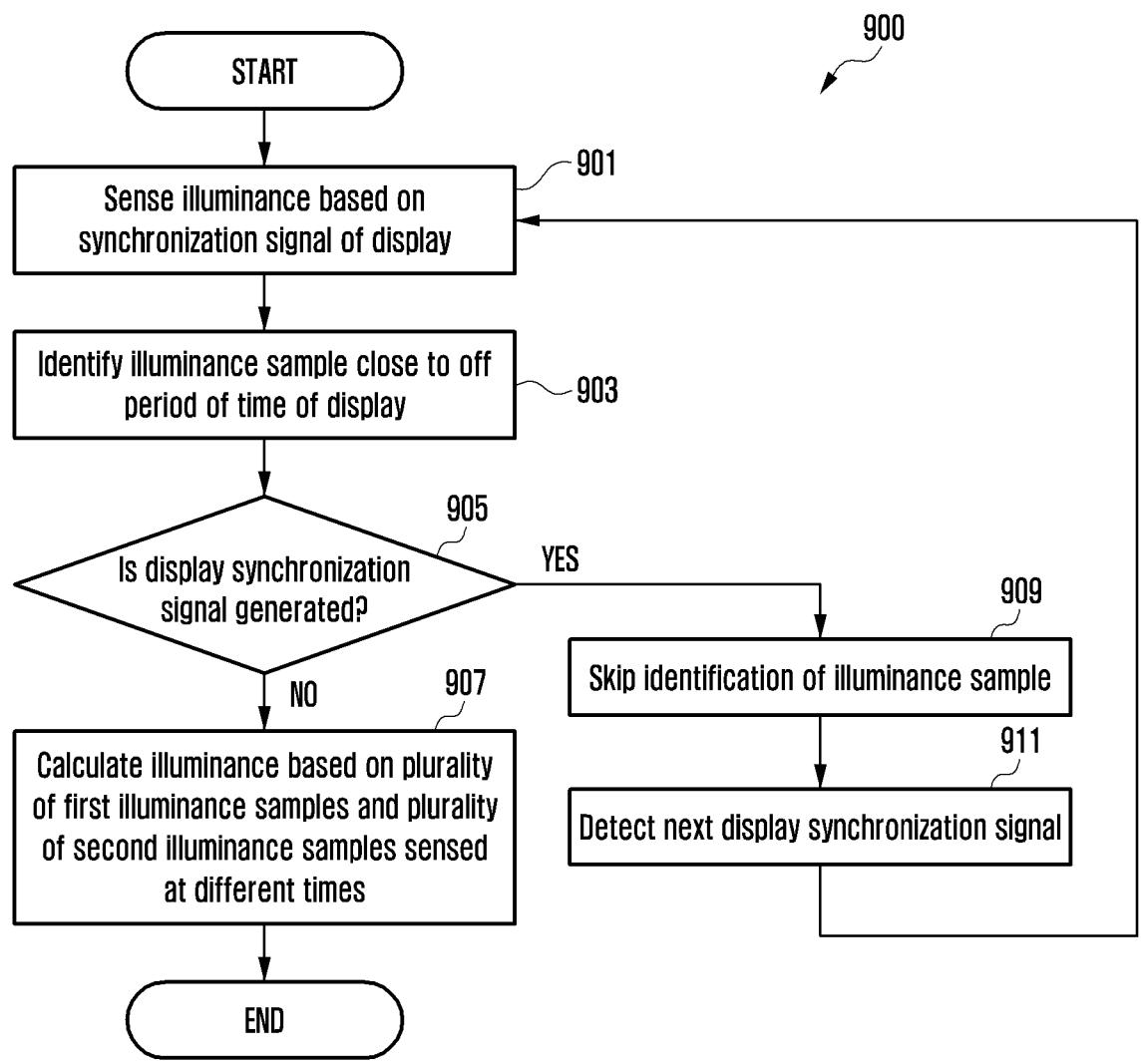
FIG. 9 is a flowchart illustrating a third illuminance measurement method of an electronic device according to an embodiment of the disclosure.

FIG. 9 is a flowchart 900 illustrating a third illuminance measurement method of an electronic device according to an embodiment of the disclosure.

Referring to FIG. 9, in operation 901, a processor (e.g., a processor 120 in FIG. 1) of an electronic device (e.g., an electronic device 101 in FIG. 1) according to various embodiments may perform control to sense illuminance, based on a synchronization signal of a display. A light-measuring sensor (e.g., the light-measuring sensor 250 in FIGS. 2A and 2B) may sense illuminance from the sensing start timing 371, based on the sensing interval timing 373, to obtain a specified number of illuminance samples during a display operation period. The processor 120 may obtain a plurality of sensed illuminance samples from the light-measuring sensor 250 and store the same in a memory (e.g., the memory 130 in FIG. 1). The light-measuring sensor 250 may store the plurality of sensed illuminance samples in a sensor memory buffer. Since operation 901 is the same as or similar to operation 501, a detailed description thereof will be omitted.

In operation 903, the processor 120 may identify (or obtain) an illuminance sample (or illuminance value) close to an off period of time of the display. The processor 120 may identify an illuminance sample (or illuminance value) close to an off period of time of the display from among a plurality of illuminance samples sensed by the light-measuring sensor 250. In an embodiment, the processor 120 may identify a plurality of illuminance samples including an illuminance sample sensed first during one display operation period. In another embodiment, the processor 120 may identify an illuminance sample (or illuminance value) sensed during an off period of time of the display from among the plurality of illuminance samples stored in the memory 130 or stored in the sensor memory buffer.

In operation 905, the processor 120 may determine whether or not a synchronization signal of the display is generated during the sensing interval timing. According to a comparative example, if a synchronization signal of the display is generated during the sensing interval timing, the processor 120 may use an illuminance sample sensed at an on period of time of the display for calculation of illuminance. According to some embodiments, the processor 120 may determine whether or not a synchronization signal of the display is generated during the sensing interval timing. The processor 120 may perform operation 909 if a synchronization signal of the display is generated during the sensing interval timing and perform operation 907 if a synchronization signal of the display is not generated during the sensing interval timing.

According to various embodiments, if a synchronization signal of the display is not generated during the sensing interval timing, the processor 120 may calculate illuminance, based on a plurality of first illuminance samples and a plurality of second illuminance samples, which are sensed at different times in operation 907. For example, the processor 120 may calculate illuminance, based on a maximum value and a minimum value of a plurality of first illuminance samples sensed close to the off period of time of the display and a plurality of second illuminance samples sensed in the rest of the display operation period. In an embodiment, the plurality of second illuminance samples may partially overlap the plurality of first illuminance samples.

According to other embodiments, the processor 120 may identify a plurality of first illuminance samples sensed after a display synchronization signal is generated from among a plurality of illuminance samples stored in the memory 130 or stored in the sensor memory buffer. The plurality of first illuminance samples may indicate illuminance samples sensed close to an off period of time of the display. The plurality of second illuminance samples may indicate illuminance samples sensed in the rest of the display operation period (e.g., an on period of time of the display). In an embodiment, the processor 120 may obtain an amplitude value of illuminance corresponding to color information using the plurality of first illuminance samples. In another embodiment, the processor 120 may calculate illuminance by subtracting a value obtained by multiplying an amplitude value of illuminance by a variable from a median value of the plurality of second illuminance samples.

According to various embodiments, a third illuminance measurement method (or third algorithm) may obtain an amplitude value (Delta) corresponding to color information and subtract the same from an average value of one period to eliminate the display effect. For example, amplitude value (Delta) of illuminance={(A (e.g., first illuminance sample among a plurality of first illuminance samples)−B (e.g., second illuminance sample among a plurality of first illuminance samples))+(C (e.g., third illuminance sample among a plurality of first illuminance samples)−B (e.g., second illuminance sample among a plurality of first illuminance samples))}/2, and illuminance (Lux)=Avg (average of third illuminance sample and a plurality of second illuminance samples)−Delta*k (k is a constant). The illuminance values may be sequentially stored in the memory 130 in a FIFO manner.

According to other embodiments, if a synchronization signal of the display is generated during the sensing interval timing, the processor 120 may skip (or omit) identification (acquisition) of an illuminance sample in operation 909. The processor 120 may skip identification (acquisition) of an illuminance sample during the duty cycle of the display.

In operation 911, the processor 120 may detect a next synchronization signal of the display. If the next synchronization signal (e.g., the second synchronization signal) of the display is detected, the processor 120 may return to operation 901 and perform control to sense illuminance after the next synchronization signal.

Figure 10B:
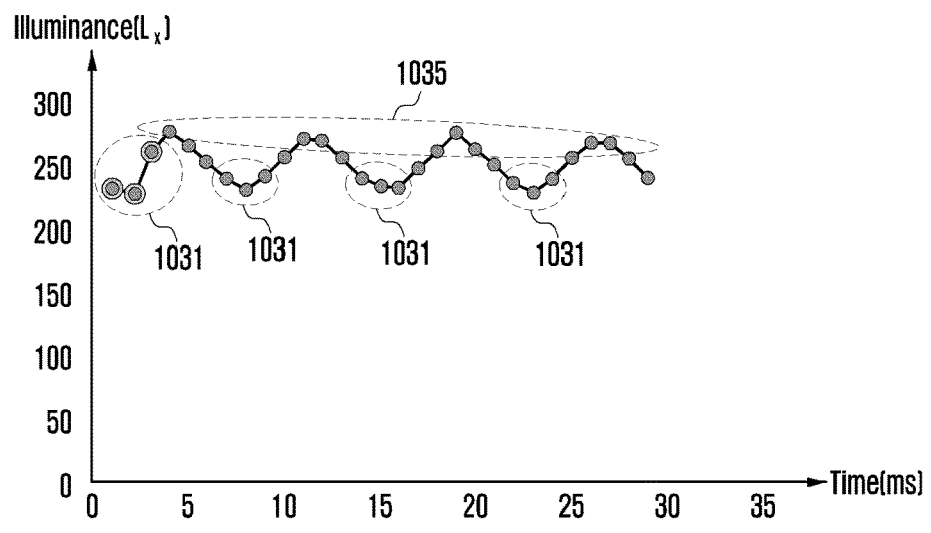
Figure 10B:
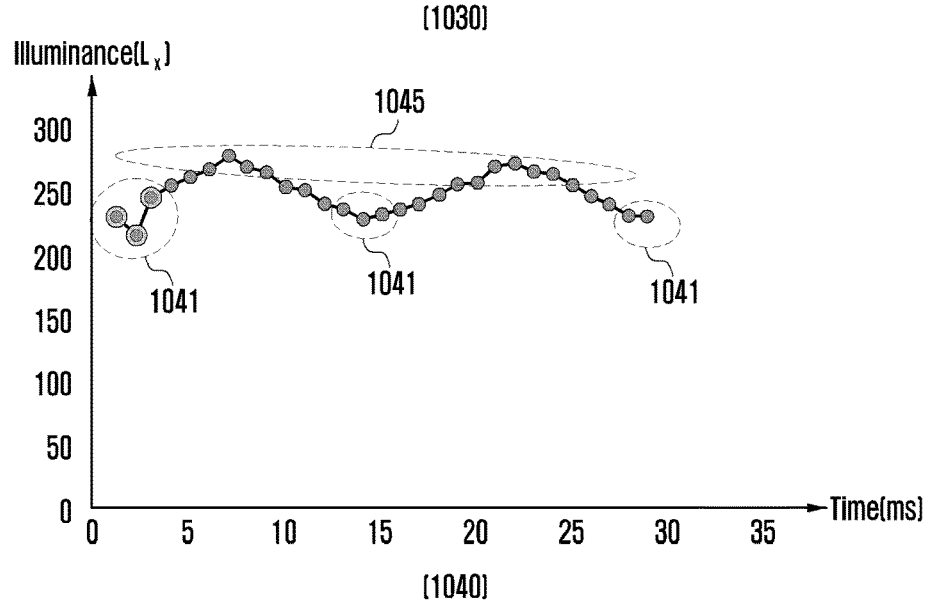
Figure 10B:
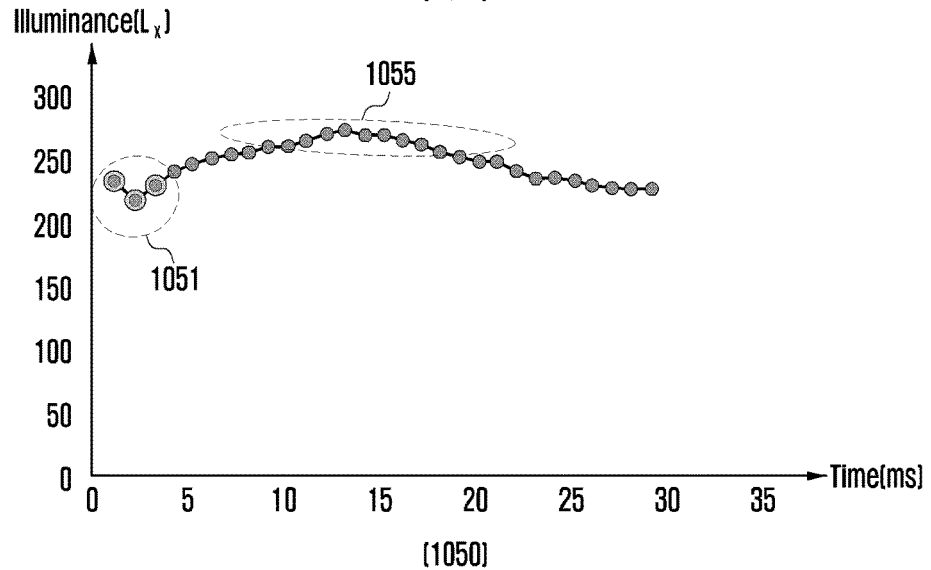
Figure 10C:
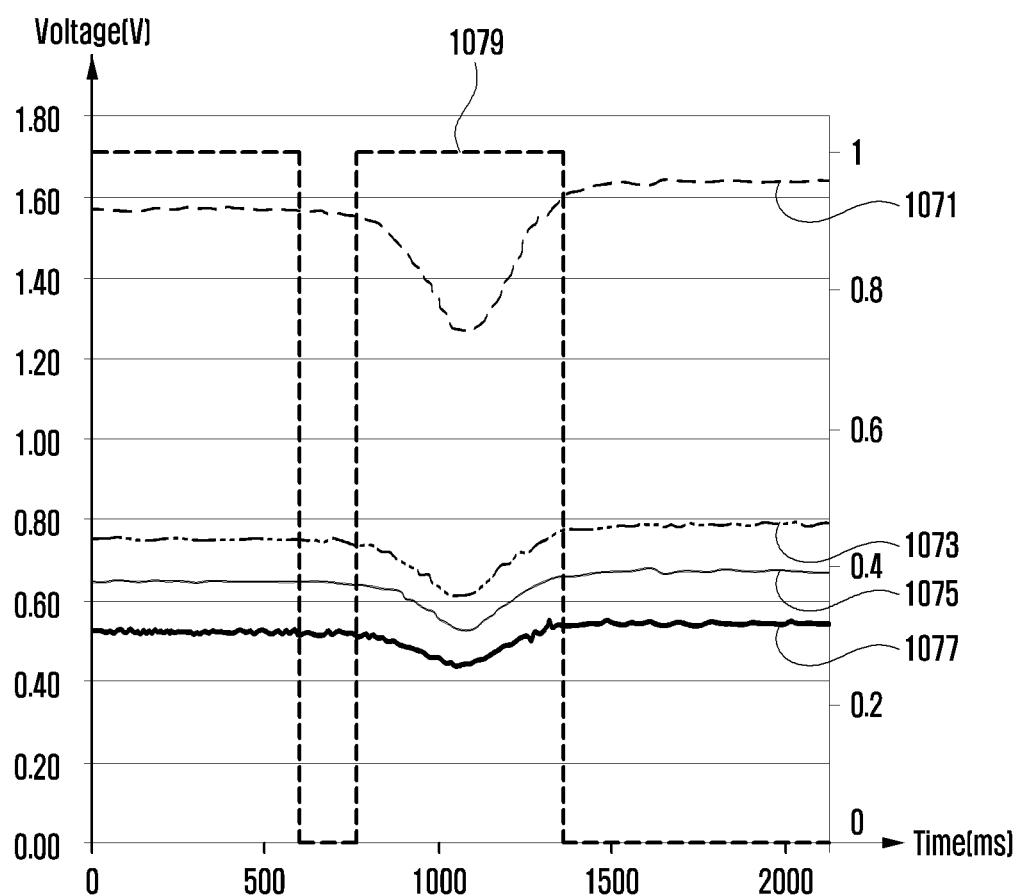

FIGS. 10A to 10C are diagrams illustrating an example of measuring illuminance, based on a third illuminance measurement method according to various embodiments of the disclosure.

FIG. 10A is a diagram illustrating an example of calculating illuminance in a third illuminance measurement method according to a display operation period.

Referring to FIG. 10A, a processor (e.g., a processor 120 in FIG. 1) of an electronic device (e.g., an electronic device 101 in FIG. 1) according to various embodiments may perform control such that illuminance sensing is performed after a predetermined time delay 1015 from a first synchronization signal 1011 in a display operation period 1010 for operation at 60 hz*1 duty (e.g., 60 hz) when the frequency of an AC light source is one of 60 hz and 240 hz. After the first synchronization signal 1011, the processor 120 may identify a plurality of first illuminance samples A, B, and C sensed close to an off period of time of the display in the display operation period (16.67 ms). In an embodiment, the processor 120 may identify a plurality of second illuminance samples C, D, E, F, G, and H sensed in the rest of the display operation period (16.67 ms). The plurality of second illuminance samples C to H may indicate illuminance values sensed at a sensing interval timing 1017 until a second synchronization signal 1013 is obtained. The plurality of second illuminance samples C to H may overlap some illuminance samples C of the plurality of first illuminance samples A, B, and C.

According to various embodiments, the processor 120 may obtain an amplitude value of illuminance corresponding to color information using the plurality of first illuminance samples A to C. For example, the amplitude value (e.g., delta) of illuminance may be obtained as {(A−B)+(C−B)}/2. In another embodiment, the processor 120 may calculate illuminance by subtracting a value obtained by multiplying the amplitude value (delta) of illuminance by a variable (e.g., k, where k is a real number) from an average of the plurality of second illuminance samples C to H. For example, illuminance may be calculated as an average of the plurality of second illuminance samples C to H−an amplitude value (delta) of illuminance*k.

FIG. 10B is a graph showing measured illuminance when the frequency of an AC light source is greater than or equal to a display operation period.

Referring to FIG. 10B, a first illuminance graph 1030 represents an illuminance sample (or illuminance value) sensed in a display operation period for operation at 60 hz*1 duty (e.g., 6 hz) when the frequency of an AC light source is 240 hz. A plurality of first illuminance samples 1031 may include a plurality of first illuminance samples A, B, and C sensed close to an off period of time of the display in the display operation period (16.67 ms) after a first synchronization signal 1011. A plurality of second illuminance samples 1035 may indicate illuminance samples C to H sensed in the rest of the display operation period (16.67 ms) at a sensing interval timing 1017 until a second synchronization signal 1013 is obtained. In yet another embodiment, the processor 120 may obtain an amplitude value by color using the plurality of first illuminance samples 1031 and obtain an average value of some of the plurality of first illuminance samples 1031 and the plurality of second illuminance samples 1035, thereby calculating illuminance.

A second illuminance graph 1040 represents an illuminance sample (or illuminance value) sensed in a display operation period for operation at 60 hz*1 duty (e.g., 60 hz) when the frequency of an AC light source is 120 hz. A plurality of first illuminance samples 1041 may include a plurality of first illuminance samples A, B, and C sensed close to an off period of time of the display after a first synchronization signal 1011. A plurality of second illuminance samples 1045 may indicate illuminance samples C to H sensed in the rest of the display operation period (16.67 ms) at a sensing interval timing 1017 until a second synchronization signal 1013 is obtained. The plurality of second illuminance samples C to H may overlap the plurality of first illuminance samples A, B, and C in some illuminance samples C. In still another embodiment, the processor 120 may obtain an amplitude value by color using the plurality of first illuminance samples 1041 and obtain an average value of the plurality of second illuminance samples 1045, thereby calculating illuminance.

A third illuminance graph 1050 represents an illuminance sample (or illuminance value) sensed in a display operation period for operation at 60 hz*1 duty (e.g., 60 hz) when the frequency of an AC light source is 60 hz. A plurality of first illuminance samples 1051 may include a plurality of first illuminance samples A, B, and C sensed close to an off period of time of the display after a first synchronization signal 1011. A plurality of second illuminance samples 1055 may indicate illuminance samples C to H sensed in the rest of the display operation period (16.67 ms) at a sensing interval timing 1017 until a second synchronization signal 1013 is obtained. The plurality of second illuminance samples C to H may overlap the plurality of first illuminance samples A, B, and C in some illuminance samples C. In an embodiment, the processor 120 may obtain an amplitude value by color using the plurality of first illuminance samples 1051 and obtain an average value of the plurality of second illuminance samples 1055, thereby calculating illuminance.

FIG. 10C illustrates a voltage graph for each color when the frequency of an AC light source is greater than or equal to a display operation period.

Referring to FIG. 10C, the x-axis of the voltage graph 1070 for each color may represent time, and the y-axis thereof may represent voltage. A first signal 1071 is a signal corresponding to a white color, a second signal 1073 is a signal corresponding to a green color, a third signal 1075 is a signal corresponding to a red color, a fourth signal 1077 is a signal corresponding to a blue color, and a fifth signal 1079 may indicate an operation signal (e.g., on/off) of a light-measuring sensor (e.g., the light-measuring sensor 250 in FIGS. 2A and 2B). In the operation period of the display, the difference between the off period of time of the display and the on period of time of the display may vary depending on color. Referring to the voltage graph 1070 for each color, the signal amplitude is higher for brighter colors and is lower for darker colors, so the processor 120 may discriminate colors without a color-on-pixel ratio (COPR).

According to an embodiment, in the first illuminance measurement method (e.g., operation 409 in FIG. 4) to the third illuminance measurement method (e.g., operation 411 in FIG. 4), timings displayed on a display panel (e.g., the display panel 230 in FIG. 2B) may be synchronized using electrical paths 210, 202, 203, 204, and 205 of the electronic device 101. In addition, the electronic device 101 may identify positions related to the plurality of first illuminance samples and the plurality of second illuminance samples in the third illuminance measurement method (e.g., the time close to the off period of time of the display and/or duration of the on period of time of the display) using the AOR, duty cycle, and/or display operation period.

Figure 11:
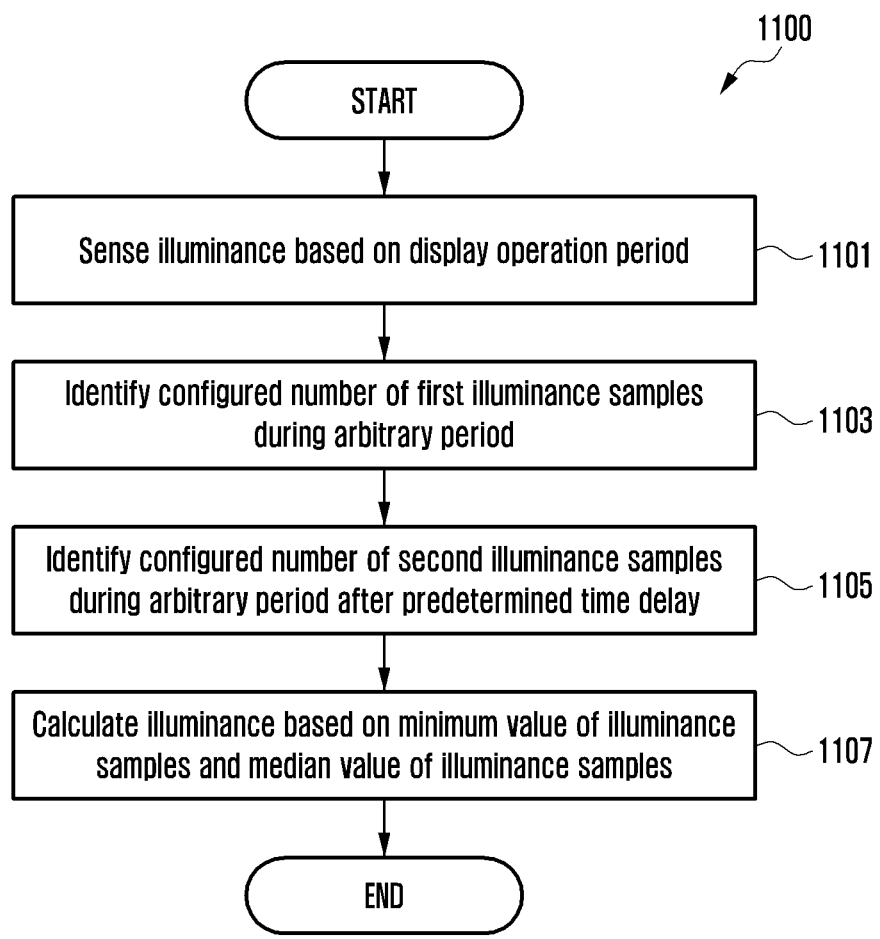
FIG. 11 is a flowchart illustrating a fourth illuminance measurement method of an electronic device according to an embodiment of the disclosure.

FIG. 11 is a flowchart 1100 illustrating a fourth illuminance measurement method (e.g., a fourth algorithm) of an electronic device according to an embodiment of the disclosure.

Referring to FIG. 11, a fourth measurement method may be performed in the case where an electrical path for synchronization of timing is not established between a light-measuring sensor (e.g., the light-measuring sensor 250 in FIGS. 2A and 2B) and a display driving circuit (e.g., the display driving circuit 210 in FIGS. 2A and 2B).

In operation 1101, a processor (e.g., a processor 120 in FIG. 1) of an electronic device (e.g., an electronic device 101 in FIG. 1) according to various embodiments may perform control to sense illuminance, based on a display operation period. In the case where the light-measuring sensor 250 and the display driving circuit 210 are not synchronized in timing, the processor 120 may configure an illuminance sensing time in units of duty of the display in order to average illuminance samples (illuminance values) sensed during one duty. Since the light-measuring sensor 250 is not aware of the synchronization signal of the display, it may measure illuminance, based on the illuminance sensing time. In another embodiment, the processor 120 may obtain a plurality of sensed illuminance samples from the light-measuring sensor 250 and store the same in a memory (e.g., the memory 130 in FIG. 1). The light-measuring sensor 250 may store the plurality of sensed illuminance samples in a sensor memory buffer.

In operation 1103, the processor 120 may identify a configured number of first illuminance samples during an arbitrary period. In yet another embodiment, the processor 120 may configure an arbitrary period for collecting illuminance samples, configure the number first illuminance samples to be identified, and identify a configured number of first illuminance samples during the arbitrary period.

In operation 1105, the processor 120 may identify a configured number of second illuminance samples during an arbitrary period after a predetermined time delay (e.g., ½ duty). Since the period is arbitrarily configured, an incorrect illuminance sample may be identified if the period is incorrectly configured. Since the operation period of the display is constant regardless of an external light source, the average value of illuminance samples for 1 duty may be the same. When external light is incident from an AC light source, the amount of light from the AC light source may be compensated for using an average difference between duty cycles. The processor 120 may identify a configured number of second illuminance samples during an arbitrary period after a predetermined time delay (e.g., phase shift) in the arbitrary period. For example, the processor 120 may identify illuminance samples (e.g., second illuminance samples) for 1 duty after a time delay by ½ duty.

In operation 1107, the processor 120 may calculate illuminance, based on a minimum value of the illuminance samples and a median value of the illuminance samples. The minimum value of the illuminance samples may indicate a minimum value of all illuminance samples including the first illuminance samples and the second illuminance samples. The median value of the illuminance samples may be a value obtained by subtracting the minimum value from the maximum value among the average value of the first illuminance samples and the average value of the second illuminance samples. For example, illuminance may be minimum value of all illuminance samples−(maximum value of average−minimum value of average)/2.

FIGS. 12A to 12E are diagrams illustrating an example of measuring illuminance, based on a fourth illuminance measurement method (e.g., a fourth algorithm) according to various embodiments of the disclosure.

Figure 12A:
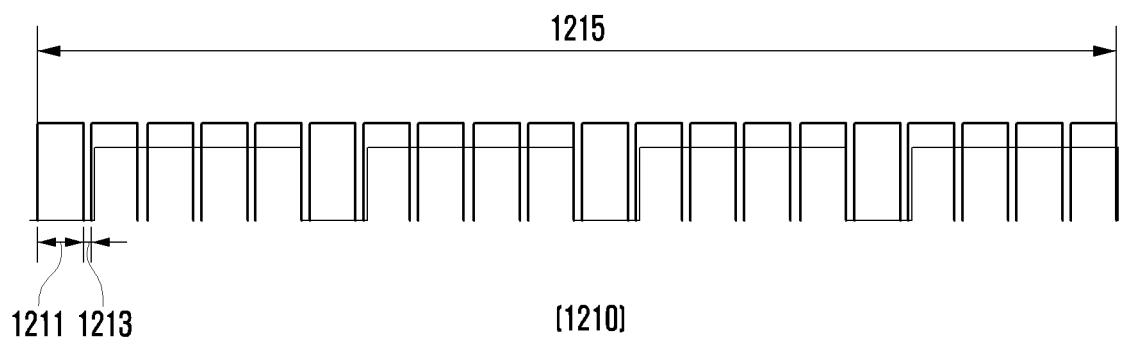

FIG. 12A illustrates an example of identifying a configured number of illuminance samples during an arbitrary period.

Referring to the graph 1210 in FIG. 12A, a processor (e.g., a processor 120 in FIG. 1) of an electronic device (e.g., an electronic device 101 in FIG. 1) according to various embodiments, if the light-measuring sensor 250 and the display driving circuit 210 are not synchronized in timing, may configure an illuminance sensing time 1211 in units of duty of the display. For example, the processor 120 may configure the illuminance sensing time 1211, based on an operation period of the display operated at 60 hz*4 duty. In an embodiment, the processor 120 may configure the illuminance sensing time 1211, based on a sensing interval timing 1213 representing the interval between illuminance sensing times or the number of illuminance samples to be obtained during the display operation period (e.g., the number of illuminance samples 375 in FIG. 3B). In an embodiment, the processor 120 may configure an arbitrary period 1215 to collect illuminance samples, configure the number of first illuminance samples to be identified, and identify the configured number of first illuminance samples during the arbitrary period. According to various embodiments, a table 1230 may represent an arbitrary period/number of samples and an illuminance sensing time 1211 depending on the number of illuminance samples. Referring to the table 1230, it may be seen that the illuminance sensing time 1211 decreases as the number of illuminance samples increases.

Figure 12B:
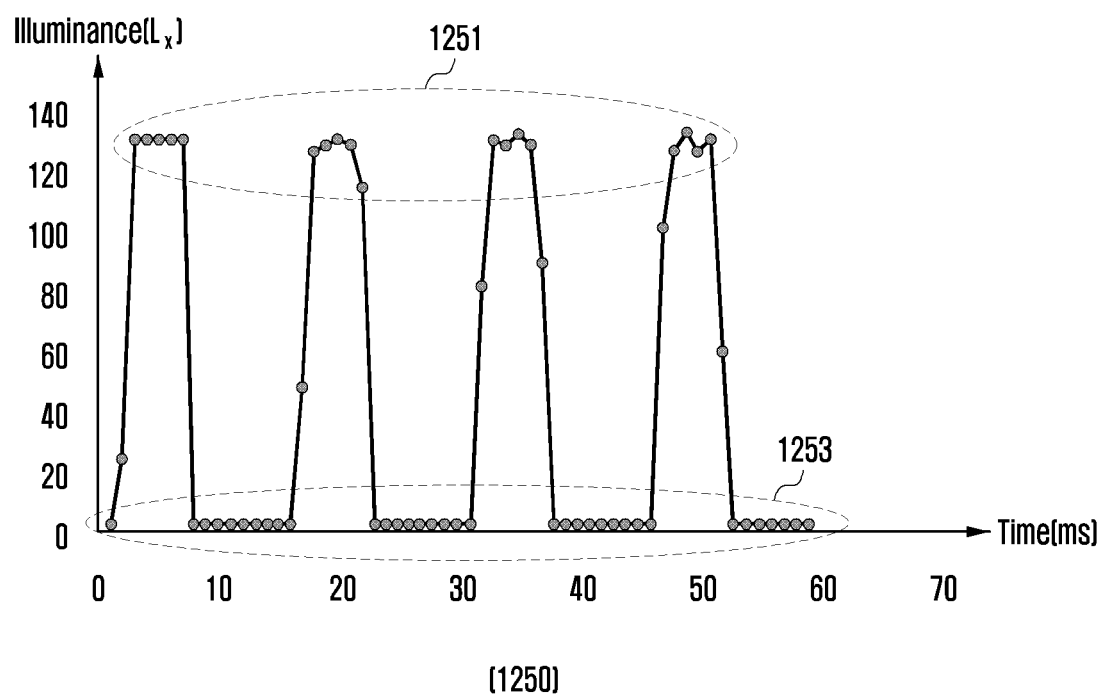

FIG. 12B illustrates an illuminance graph according to a first color.

Referring to FIG. 12B, the first color may be a dark color, for example, black. The processor 120 may configure an illuminance sensing time as 357 us, obtain a configured number of (e.g., 7) first illuminance samples during an arbitrary period (e.g., 1 duty), obtain a configured number of second illuminance samples during an arbitrary period after a predetermined time (e.g., ½ duty), obtain a configured number of third illuminance samples during an arbitrary period after a predetermined time, obtain a configured number of fourth illuminance samples during an arbitrary period after a predetermined time, obtain a configured number of fifth illuminance samples during an arbitrary period after a predetermined time, obtain a configured number of sixth illuminance samples during an arbitrary period after a predetermined time, and obtain a configured number of seventh illuminance samples during an arbitrary period after a predetermined time. Referring to an illuminance graph 1250, the processor 120 may identify a maximum value 1251 and a minimum value 1253 of the illuminance samples, based on the first illuminance samples to the seventh illuminance samples.

FIG. 12C illustrates a table showing illuminance values and the average of the illuminance values according to a first color.

Referring to FIG. 12C, referring to a table 1260, the processor 120 may obtain a configured number of first illuminance samples (e.g., 1 to 7) during an arbitrary period and calculate an average value (96.0) of the first illuminance samples. The processor 120 may obtain a configured number of second illuminance samples (e.g., 8 to 14) during an arbitrary period after a predetermined time (e.g., ½ duty) and calculate an average value (0.0) of the second illuminance samples. The processor 120 may obtain a configured number of third illuminance samples (e.g., 15 to 21) during an arbitrary period after a predetermined time and calculate an average value (79.70) of the third illuminance samples. In an embodiment, the processor 120 may obtain a configured number of fourth illuminance samples (e.g., 22 to 28) during an arbitrary period after a predetermined time and calculate an average value (16.3) of the fourth illuminance samples. In another embodiment, the processor 120 may obtain a configured number of fifth illuminance samples (e.g., 33 to 39) during an arbitrary period after skipping a predetermined time and calculate an average value (86.6) of the fifth illuminance samples. The processor 120 may obtain a configured number of sixth illuminance samples (e.g., 40 to 46) during an arbitrary period after a predetermined time and calculate an average value (0.0) of the sixth illuminance samples. In yet another embodiment, the processor 120 may obtain a configured number of seventh illuminance samples (e.g., 47 to 53) during an arbitrary period after a predetermined time and calculate an average value (96.0) of the seventh illuminance samples.

The processor 120 may calculate illuminance, based on a minimum value of the illuminance samples and a median value of the illuminance samples. For example, illuminance for the first color may be obtained as minimum value of all illuminance samples (e.g., 0)+{maximum value of average value (e.g., 96)−minimum value of average value (e.g., 0)}/2.

Figure 12D:
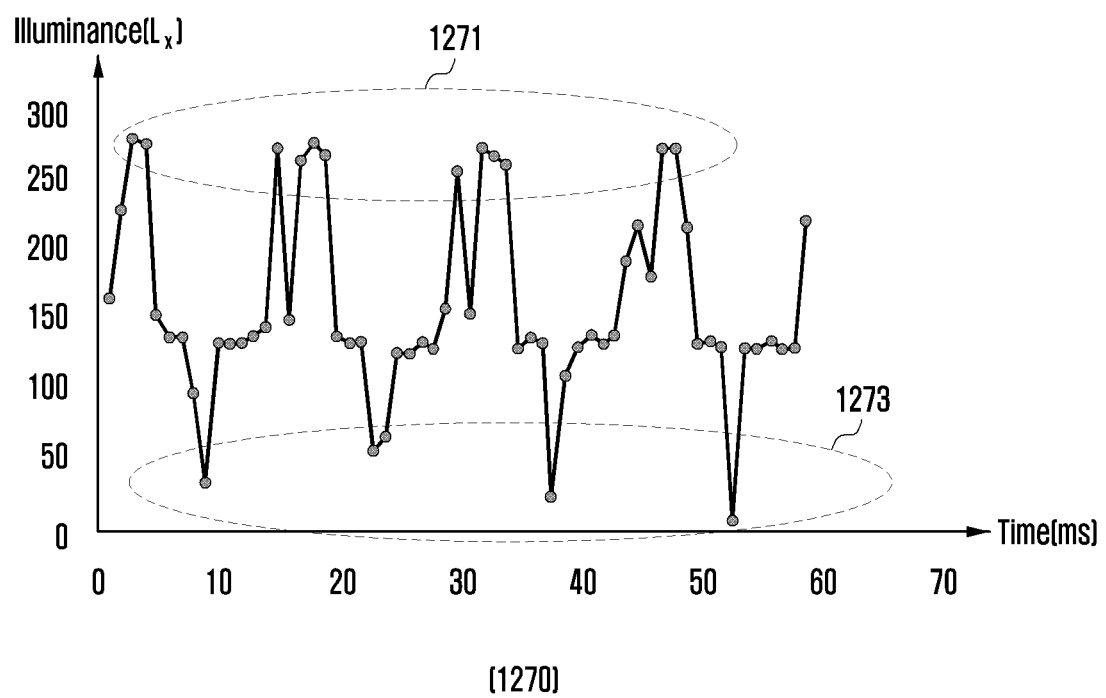

FIG. 12D illustrates an illuminance graph according to a second color.

Referring to FIG. 12D, the second color may be a bright color, for example, white. In an embodiment, the processor 120 may configure an illuminance sensing time as 357 us and obtain first illuminance samples to seventh illuminance samples during an arbitrary period. Since the operation of obtaining the first illuminance samples to the seventh illuminance samples has been described in detail with reference to FIG. 12B, detailed descriptions thereof will be omitted.

Referring to an illuminance graph 1270, the processor 120 may identify a maximum value 1271 and a minimum value 1273 of the illuminance samples, based on the first illuminance samples to the seventh illuminance samples.

FIG. 12E illustrates a table showing illuminance values and the average of the illuminance values according to a second color.

Referring to FIG. 12E, referring to a table 1280, the processor 120 may calculate illuminance, based on a minimum value of the illuminance samples and a median value of the illuminance samples. For example, illuminance for the second color may be obtained as minimum value of all illuminance samples (e.g., 0)+{maximum value of average value (e.g., 209.7)−minimum value of average value (e.g., 104.0)}/2.

An operation method of an electronic device according to various embodiments of the disclosure may include analyzing a frequency of an external light source, obtaining an operation period of a display module included in the electronic device, obtaining a ratio of an off period of time of the display, based on the operation period, and calculating illuminance using different algorithms, based on the ratio of an off period of time of the display and a relationship between the frequency of the external light source and the operation period.

In an embodiment, the calculating may include determining whether the ratio of an off period of time is less than or equal to a configured threshold value and, if the ratio of an off period of time is less than or equal to the configured threshold value, calculating illuminance, based on a third algorithm.

The calculating may include, if the ratio of an off period of time is less than or equal to the configured threshold value, calculating illuminance, based on a plurality of first illuminance samples sensed, based on the off period of time of the display, based on a synchronization signal of the display, and a median value of a plurality of second illuminance samples sensed in the rest of the display operation period.

In an embodiment, the calculating may include calculating an amplitude value of illuminance corresponding to color information using the plurality of first illuminance samples and calculating illuminance by subtracting a value obtained by multiplying the amplitude value of illuminance by a variable from the median value of the plurality of second illuminance samples.

In another embodiment, the calculating may include determining, if the ratio of an off period of time exceeds the configured threshold value, whether or not the frequency of the external light source is less than the operation period and, if the frequency of the external light source is less than the operation period, calculating illuminance, based on a first algorithm.

In still another embodiment, the calculating may include, if the frequency of the external light source is less than the operation period, calculating, as illuminance, an average of illuminance samples sensed during the off period of time of the display, based on a synchronization signal of the display, or a sum of illuminance samples sensed during the off period of time of the display.

The calculating may include, if the frequency of the external light source is greater than or equal to the operation period, calculating illuminance using first illuminance sample sensed during the off period of time of the display, based on a synchronization signal of the display, and a median value of second illuminance samples sensed during an on period of time of the display.

In an embodiment, the calculating may include calculating an amplitude value of illuminance, based on a minimum value and a maximum value of the second illuminance samples, and calculating illuminance by summating the first illuminance sample and the amplitude value of illuminance.

In another embodiment, the calculating may include identifying, when not synchronized with the light-measuring sensor, a configured number of first illuminance samples during an arbitrary period, identifying a configured number of second illuminance samples during the arbitrary period after a predetermined time delay, and calculating illuminance, based on the first illuminance samples and the second illuminance samples.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a light-measuring sensor;
   a display;
   a memory; and
   at least one processor operatively connected to the light-measuring sensor, the display, and the memory,
   wherein the at least one processor is configured to:
      analyze a frequency of an external light source,
      obtain an operation period of the display,
      obtain a ratio of an off period of time of the display, based on the operation period, and
      calculate illuminance using different algorithms, based on the ratio of an off period of time of the display and a relationship between the frequency of the external light source and the operation period.

2. The electronic device of claim 1, wherein the at least one processor is further configured to:
   determine whether the ratio of an off period of time is less than or equal to a configured threshold value, and
   in response to the ratio of an off period of time being less than or equal to the configured threshold value, calculate illuminance, based on a third algorithm.

3. The electronic device of claim 2, wherein the at least one processor is further configured to calculate illuminance, based on a plurality of first illuminance samples sensed, based on the off period of time of the display, based on a synchronization signal of the display, and a median value of a plurality of second illuminance samples sensed in the rest of the display operation period in response to the ratio of an off period of time being equal to or less than the configured threshold value.

4. The electronic device of claim 3,
   wherein some of the plurality of second illuminance samples overlap the plurality of first illuminance samples, and
   wherein the at least one processor is further configured to:
      calculate an amplitude value of illuminance corresponding to color information using the plurality of first illuminance samples, and
      calculate illuminance by subtracting a value obtained by multiplying the amplitude value of illuminance by a variable from the median value of the plurality of second illuminance samples.

5. The electronic device of claim 2, wherein the at least one processor is further configured to:
   determine, in response to the ratio of an off period of time exceeding the configured threshold value, whether or not the frequency of the external light source is less than the operation period, and
   calculate, in response to the frequency of the external light source being less than the operation period, illuminance, based on a first algorithm.

6. The electronic device of claim 5, wherein the at least one processor is further configured to calculate, as illuminance, an average of illuminance samples sensed during the off period of time of the display, based on a synchronization signal of the display, or a sum of illuminance samples sensed during the off period of time of the display in response to the frequency of the external light source is-being less than the operation period.

7. The electronic device of claim 5, wherein the at least one processor is further configured to calculate illuminance, in response to the frequency of the external light source being greater than or equal to the operation period, using first illuminance sample sensed first during the display operation period, based on a synchronization signal of the display, and a median value of a plurality of illuminance samples sensed at sensing timing intervals during the display operation period.

8. The electronic device of claim 7, wherein the at least one processor is further configured to:
   calculate an amplitude value of illuminance, based on a minimum value and a maximum value of the plurality of illuminance samples, and
   calculate illuminance by summating the first illuminance sample and the amplitude value of illuminance.

9. The electronic device of claim 1, wherein the at least one processor is further configured to calculate illuminance, in response to the at least one processor being synchronized with the light-measuring sensor, using different algorithms, based on a ratio of an off period of time of the display and a relationship between the frequency of the external light source and the operation period.

10. The electronic device of claim 1, wherein the at least one processor is further configured to:
    identify, in response to the at least one processor being not synchronized with the light-measuring sensor, a configured number of first illuminance samples during an arbitrary period,
    identify a configured number of second illuminance samples during the arbitrary period after a predetermined time delay, and
    calculate illuminance, based on the first illuminance samples and the second illuminance samples.

11. The electronic device of claim 10, wherein the at least one processor is further configured to:
    calculate a minimum value of all illuminance samples including the first illuminance samples and the second illuminance samples,
    calculate a median value between an average value of the first illuminance samples and an average value of the second illuminance samples, and
    calculate illuminance, based on the minimum value of all the illuminance samples and the median value of the illuminance samples.

12. A method of operating an electronic device, the method comprising:
    analyzing a frequency of an external light source;
    obtaining an operation period of a display included in the electronic device;
    obtaining a ratio of an off period of time of the display, based on the operation period; and
    calculating illuminance using different algorithms, based on the ratio of an off period of time of the display and a relationship between the frequency of the external light source and the operation period.

13. The method of claim 12, wherein the calculating comprises:
   determining whether the ratio of an off period of time is less than or equal to a configured threshold value; and
   in response to the ratio of an off period of time being less than or equal to the configured threshold value, calculating illuminance, based on a third algorithm.

14. The method of claim 13, wherein the calculating comprises:
   calculating illuminance, based on a plurality of first illuminance samples sensed, based on the off period of time of the display, based on a synchronization signal of the display, and a median value of a plurality of second illuminance samples sensed in the rest of the display operation period.

15. The method of claim 14, wherein the calculating comprises:
   calculating an amplitude value of illuminance corresponding to color information using the plurality of first illuminance samples; and
   calculating illuminance by subtracting a value obtained by multiplying the amplitude value of illuminance by a variable from the median value of the plurality of second illuminance samples.

16. The method of claim 13, wherein the calculating comprises:
   in response to the ratio of an off period of time exceeding the configured threshold value, determining whether or not the frequency of the external light source is less than the operation period; and
   in response to the frequency of the external light source being less than the operation period, calculating, as illuminance, based on a first algorithm.

17. The method of claim 16, wherein the calculating comprises:
   calculating, as illuminance an average of illuminance samples sensed during the off period of time of the display, based on a synchronization signal of the display, or a sum of illuminance samples sensed during the off period of time of the display.

18. The method of claim 16, wherein the calculating comprises:
   in response to the frequency of the external light source being greater than or equal to the operation period, calculating illuminance using first illuminance sample sensed during the off period of time of the display, based on a synchronization signal of the display, and a median value of second illuminance samples sensed during an on period of time of the display.

19. The method of claim 18, wherein the calculating comprises:
   calculating an amplitude value of illuminance, based on a minimum value and a maximum value of the second illuminance samples, and
   calculating illuminance by summating the first illuminance sample and the amplitude value of illuminance.

20. The method of claim 12, wherein the calculating comprises:
   identifying, when not synchronized with a light-measuring sensor, a configured number of first illuminance samples during an arbitrary period,
   identifying a configured number of second illuminance samples during the arbitrary period after a predetermined time delay, and
   calculating illuminance, based on the first illuminance samples and the second illuminance samples.

* * * * *